US011582458B2

(12) United States Patent
He et al.

(10) Patent No.: US 11,582,458 B2
(45) Date of Patent: Feb. 14, 2023

(54) ADAPTIVE MOTION VECTOR PRECISION FOR AFFINE MOTION MODEL BASED VIDEO CODING

(71) Applicant: Vid Scale, Inc., Wilmington, DE (US)

(72) Inventors: Yuwen He, San Diego, CA (US); Xiaoyu Xiu, San Diego, CA (US); Yan Ye, San Diego, CA (US); Jiancong Luo, Skillman, NJ (US)

(73) Assignee: Vid Scale, Inc., Wilmington, DE (US)

( * ) Notice: Subject to any disclaimer, the term of this patent is extended or adjusted under 35 U.S.C. 154(b) by 0 days.

(21) Appl. No.: 17/269,937

(22) PCT Filed: Aug. 28, 2019

(86) PCT No.: PCT/US2019/048615
§ 371 (c)(1),
(2) Date: Feb. 19, 2021

(87) PCT Pub. No.: WO2020/047132
PCT Pub. Date: Mar. 5, 2020

(65) Prior Publication Data
US 2021/0203947 A1    Jul. 1, 2021

Related U.S. Application Data

(60) Provisional application No. 62/786,768, filed on Dec. 31, 2018, provisional application No. 62/773,069, (Continued)

(51) Int. Cl.
*H04N 19/137* (2014.01)
*H04N 19/159* (2014.01)
(Continued)

(52) U.S. Cl.
CPC ......... *H04N 19/137* (2014.11); *H04N 19/159* (2014.11); *H04N 19/176* (2014.11); *H04N 19/192* (2014.11)

(58) Field of Classification Search
None
See application file for complete search history.

(56) References Cited

U.S. PATENT DOCUMENTS

| 2018/0098089 | A1  | 4/2018 | Chen |
| 2020/0177877 | A1* | 6/2020 | Chen ............... H04N 19/176 |
| 2021/0136404 | A1* | 5/2021 | Chen ............... H04N 19/50 |

FOREIGN PATENT DOCUMENTS

| WO | 2017157259 A1 | 9/2017 |
| WO | 2018064524 A1 | 4/2018 |

OTHER PUBLICATIONS

International Search Report and Written Opinion of the International Searching Authority for PCT/US2019/048615 dated Nov. 20, 2019, 13 pages.

(Continued)

*Primary Examiner* — Christopher G Findley
(74) *Attorney, Agent, or Firm* — Invention Mine LLC

(57) ABSTRACT

Systems and methods are described for video coding using affine motion models with adaptive precision. In an example, a block of video is encoded in a bitstream using an affine motion model, where the affine motion model is characterized by at least two motion vectors. A precision is selected for each of the motion vectors, and the selected precisions are signaled in the bitstream. In some embodiments, the precisions are signaled by including in the bitstream information that identifies one of a plurality of elements in a selected predetermined precision set. The identified element indicates the precision of each of the motion vectors that characterize the affine motion model. In some embodiments, the precision set to be used is signaled (Continued)

expressly in the bitstream; in other embodiments, the precision set may be inferred, e.g., from the block size, block shape or temporal layer.

20 Claims, 16 Drawing Sheets

Related U.S. Application Data filed on Nov. 29, 2018, provisional application No. 62/724,500, filed on Aug. 29, 2018.

(51) Int. Cl.
*H04N 19/176* (2014.01)
*H04N 19/192* (2014.01)

(56) References Cited

OTHER PUBLICATIONS

Chen, Y-W, et. al. "Description of SDR, HDR, and 360° Video Coding Technology Proposal by Qualcomm and Technicolor: Low and High Complexity Versions". Joint Video Exploration Team, JVET-J0021, JVET Meeting, Apr. 10-20, 2018.
He, Yuwen, et. al., "CE4-Related: Adaptive Precision for Affine MVD Coding". Joint Video Exploration Team, JVET-L0259, Oct. 6, 2018, 4 pages.
Luo, Jiancong, et. al., "CE2: Adaptive Precision for Affine MVD Coding (Test 2.1.1)". Joint Video Exploration Team, JVET-M0420, Jan. 3, 2019.
Luo, Jiancong, et. al., "CE2-Related: Prediction Refinement With Optical Flow for Affine Mode". Joint Video Exploration Team (JVET) ISO/IEC JTC1/SC29/WG11 and ITU-T SG.16, JVET-N0236, Mar. 14, 2019.
Bross, Benjamin, et. al., "Versatile Video Coding (Draft 4)". Joint Video Exploration Team (JVET) ISO/IEC JTC1/SC29/WG11 and ITU-T SG.16, JVET-M1001, Mar. 9, 2019.
Chen, J., et. al., "Enhanced Motion Vector Difference Coding". Joint Video Exploration Team (JVET) ISO/IEC JTC1/SC29/WG11 and ITU-T SG.16, JVET-D0123-v3, Oct. 16, 2016.
Chen, Jianle, et. al., "Algorithm Description for Versatile Video Coding and Test Model 5 (VTM 5)". Joint Video Experts Team (JVET) of ITU-T SG 16 WP 3 and ISO/IEC JTC 1/SC 29/WG 11, JVET-N1002-v2, Mar. 19-27, 2019, 76 pages.
International Search Report and Written Opinion of the international Searching Authority for PCT/US2020/038476 dated Aug. 11, 2020, 10 pages.
ITU-T Recommendation H.264 and ISO/IEC/MPEG-4 part 10, "Advanced Video Coding for Generic Audiovisual Services", Series H: Audiovisual and Multimedia Systems, Infrastructure of audiovisual services—Coding of moving video, Nov. 2007, 564 pages.
SMPTE 421M, "VC-1 Compressed Video Bitstream Format and Decoding Process". SMPTE Standard, Apr. 2006, 493 pages.
Bross, Benjamin, et. al., "High Efficiency Video Coding (HEVC) Text Specification Draft 10 (for FDIS and Last Call)". Joint Collaborative Team on Video Coding (JCT-VC), Document No. JCTVC-L1003, Jan. 2013, 310 pages.
Chen, J., et. al., "Coding Tools Investigation for Next Generation Video Coding". Qualcomm Incorporated, Telecommunication Standardization Sector ITU-T SG16/Q6, Doc. COM16-C806, Jan. 2015.
Alshina, E., et. al., "Known Tools Performance Investigation for Next Generation Video Coding". ITU—Telecommunications Standardization Sector, SG16/Q6, Video Coding Experts Group (VCEG), Jun. 2015, VCEG-AZ05, 7 pages.
Karczewicz, M., et. al., "Report of AHG1 on Coding Efficiency Improvements". ITU—Telecommunications Standardization Sector, Video Coding Experts Group (VCEG), SG16/Q6, VCEG-AZ01, Jun. 2015, 2 pages.

Ohm, Jens-Rainer., et. al., "Report of AHG on Future Video Coding Standardization Challenges". International Organization for Standardization, Coding of Moving Pictures and Audio, ISO/IEC JTC1/SC29/WG11 MPEG2014/M36782, Jun. 2015, 4 pages.
Segall, Andrew, et. al. "Joint Call for Proposals on Video Compression With Capability Beyond HEVC". Joint Video Exploration Team (JVET) of ITU-T SG 16 WP 3 and ISO/IEC JTC 1/SC 29/WG 11, JVET-H1002-v6, Oct. 18-24, 2017, 27 pages.
Bross, Benjamin, "Versatile Video Coding (Draft 1)". Joint Video Experts Team (JVET) of ITU-T SG 16 WP 3 and ISO/IEC JTC 1/SC 29/WG 11 , JVET-J1001-v2, Apr. 10-20, 2018, 40 pages.
Chen, Jianle, et. al., "Algorithm Description of Joint Exploration Test Model 7 (JEM7)". Joint Video Exploration Team (JVET) of ITU-T SG 16 WP 3 and ISO/IEC JTC 1/SC 29/WG 11, JVET-G1001-v1, Jul. 13-21, 2017, 48 pages.
International Telecommunication Union, "Affine Transform Prediction for Next Generation Video Coding". Huawei Technologies Co., Ltd., Telecommunication Standardization Sector, ITU-T SG16/Q6 Doc. COM16-C1016, Sep. 2015, pp. 1-11.
Chen, Jianle, et. al., "EE4: Enhanced Motion Vector Difference Coding". Joint Video Exploration Team (JVET) of ITU-T SG 16 WP 3 and ISO/IEC JTC 1/SC 29/WG 11, JVET-E0076, Jan. 12-20, 2017, pp. 1-4.
Wikipedia, "Sobel Filter". Wikipedia web article available at: https://en.wikipedia.org/w/index.php?title=Sobel_operator&oldid=837616168, updated on Apr. 21, 2018, 9 pages.
He, Yuwen, et. al., "CE4-Related: Adaptive Precision for Affine MVD Coding". Joint Video Exploration Team, JVET-L0259, Power Point Presentation, Oct. 6, 2018, 8 pages.
Liu, Hongbin, et. a., "CE4-related: Adaptive Motion Vector Resolution for Affine Inter Mode". Joint Video Experts Team (JVET) of ITU-T SG 16 WP 3 and ISO/IEC JTC 1/SC 29/WG 11, JVET-L0332-v1, Oct. 3-12, 2018, 3 pages.
Liu, Hongbin, et. a., "CE4-related: Adaptive Motion Vector Resolution for Affine Inter Mode". Joint Video Experts Team (JVET) of ITU-T SG 16 WP 3 and ISO/IEC JTC 1/SC 29/WG 11, JVET-L0332-v1, Power Point Presentation, Oct. 3-12, 2018, 6 pages.
He, Yuwen, et. al., "CE4 Related: Affine Motion Estimation Improvements". InterDigital Communications, Inc., Joint Video Experts Team (JVET) of ITU-T SG 16 WP 3 and ISO/IEC JTC 1/SC 29/WG 11, JVET-L0260-r2, Oct. 3-12, 2018, 4 pages.
He, Yuwen, et. al., "CE4 Related: Affine Motion Estimation Improvements". InterDigital Communications, Inc., Joint Video Experts Team (JVET) of ITU-T SG 16 WP 3 and ISO/IEC JTC 1/SC 29/WG 11, JVET-L0260-r2, Power Point Presentation, Oct. 3-12, 2018, 4 pages.
Liu, Hongbin, et. al. "CE2-related: Joint Test of AMVR for Affine Inter Mode (Test 2.1.1 and Test 2.1.2)". Joint Video Experts Team (JVET) of ITU-T SG 16 WP 3 and ISO/IEC JTC 1/SC 29/WG 11, JVET-M0247, Jan. 9-18, 2019, 3 pages.
LUO , Jiancong, et. al., "CE2: Adaptive precision for affine MVD coding (Test 2.1.1)". Joint Video Experts Team (JVET) of ITU-T SG 16 WP 3 and ISO/IEC JTC 1/SC 29/WG 11, JVET-M0420, Jan. 9-18, 2019, 3 pages.
Bross, Benjamin, et. al., "Versatile Video Coding (Draft 2)". Joint Video Experts Team (JVET) of ITU-T SG 16 WP 3 and ISO/IEC JTC 1/SC 29/WG 11, JVET-K1001-v6, Jul. 2018, 140 pages.
Luo, Jiancong, et al., "CE2-related: Prediction Refinement With Optical Flow for Affine Mode". Joint Video Experts Team (JVET) of ITU-T SG 16 WP 3 and ISO/IEC JTC 1/SC 29/WG 11, JVET-N0236-r5, Mar. 19-27, 2019, 7 pages.
Luo, Jiancong, et al., "CE2-related: Prediction Refinement With Optical Flow for Affine Mode". Joint Video Experts Team (JVET) of ITU-T SG 16 WP 3 and ISO/IEC JTC 1/SC 29/WG 11, JVET-N0236-r5 Power Point Presentation, Mar. 19-27, 2019, 7 pages.
International Preliminary Report on Patentability for PCT/US2020/038476 dated Dec. 21, 2021, 7 pages.
Chen, Jianle, et. al., "Algorithm Description of Joint Exploration Test Model 6 (JEM6)". Joint Video Exploration Team (JVET) of ITU-T SG 16 WP 3 and ISO/IEC JTC 1/SC 29/WG 11, JVET-F1001-v3, Mar. 31-Apr. 7, 2017, 51 pages.

\* cited by examiner

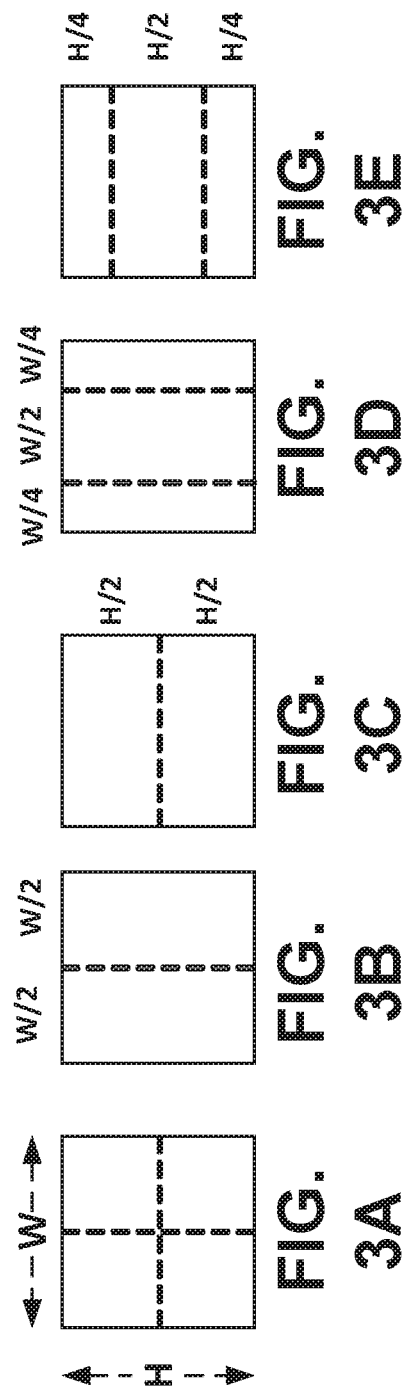

ADAPTIVE MOTION VECTOR PRECISION FOR AFFINE MOTION MODEL BASED VIDEO CODING

CROSS-REFERENCE TO RELATED APPLICATIONS

The present application is a national stage application under 35 U.S.C. 371 of International Application No. PCT/US2019/048615, entitled "ADAPTIVE MOTION VECTOR PRECISION FOR AFFINE MOTION MODEL BASED VIDEO CODING", filed on PCT Aug. 28, 2019, which claims benefit under 35 U.S.C. § 119(e) from U.S. Provisional Patent Application No. 62/724,500 (filed Aug. 29, 2018), U.S. Provisional Patent Application No. 62/773,069 (filed Nov. 29, 2018), and U.S. Provisional Patent Application No. 62/786,768 (filed Dec. 31, 2018), all of which are entitled "Adaptive Motion Vector Precision for Affine Motion Model Based Video Coding," all of which are incorporated herein by reference in their entirety.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG.

The first version of the HEVC standard was finalized in October, 2013, which offers approximately 50% bit-rate saving or equivalent perceptual quality compared to the prior generation video coding standard H.264/MPEG AVC. Although the HEVC standard provides significant coding improvements over its predecessor, there is evidence that superior coding efficiency can be achieved with additional coding tools over HEVC. Based on that, both VCEG and MPEG started the exploration work of new coding technologies for future video coding standardization. In October 2015, ITU-T VECG and ISO/IEC MPEG formed the Joint Video Exploration Team (JVET) to begin significant study of advanced technologies that could enable substantial enhancement of coding efficiency over HEVC. In the same month, a software codebase, called Joint Exploration Model (JEM) was established for future video coding exploration work. The JEM reference software was based on HEVC Test Model (HM) that was developed by JCT-VC for HEVC. Any additional proposed coding tools may be integrated into the JEM software and tested using JVET common test conditions (CTCs).

In October 2017, the joint call for proposals (CfP) on video compression with capability beyond HEVC was issued by ITU-T and ISO/IEC. In April 2018, 22 CfP responses for standard dynamic range category were received and evaluated at the 10-th JVET meeting, with demonstration of compression efficiency gain over HEVC of around 40%. Based on such evaluation results, the Joint Video Expert Team (JVET) launched a new project to develop a next generation video coding standard that is named Versatile Video Coding (WC). In the same month, a reference software codebase, called VVC test model (VTM), was established for demonstrating a reference implementation of the VVC standard. For the initial VTM-1.0, most of coding modules, including intra prediction, inter prediction, transform/inverse transform and quantization/de-quantization, and in-loop filters follows the existing HEVC design, with the exception that a multi-type tree based block partitioning structure is used in the VTM. Meanwhile, to facilitate the assessment of new coding tools, another reference software base called benchmark set (BMS) was also generated. In the BMS codebase, a list of coding tools inherited from the JEM, which provides higher coding efficiency and moderate implementation complexity, are included on top of the VTM and used as the benchmark when evaluating similar coding technologies during the VVC standardization process. Specifically, there are 9 JEM coding tools integrated in the BMS-1.0, including 65 angular intra prediction directions, modified coefficient coding, advanced multiple transform (AMT)+4×4 non-separable secondary transform (NSST), affine motion model, generalized adaptive loop filter (GALF), advanced temporal motion vector prediction (ATMVP), adaptive motion vector precision, decoder-side motion vector refinement (DMVR) and linear model (LM) chroma mode.

SUMMARY

Embodiments described herein include methods that are used in video encoding and decoding (collectively "coding"). In some embodiments, a method is provided of decoding a video from a bitstream, where the method includes, for at least one current block in the video: reading, from the bitstream, information identifying at least a first motion vector predictor and a second motion vector predictor; reading, from the bitstream, information identifying one of a plurality of precisions in a predetermined precision set; reading, from the bitstream, at least a first motion vector difference and a second motion vector difference, the first and second motion vector differences having the identified precision; generating at least (i) a first control point motion vector from the first motion vector predictor and the first motion vector difference and (ii) a second control point motion vector from the second motion vector predictor and the second motion vector difference; and generating a prediction of the current block using an affine motion model, the affine motion model being characterized by at least the first control point motion vector and the second control point motion vector.

The plurality of precisions in the predetermined precision set may include ¼-pel, $\frac{1}{16}$-pel, and 1-pel precisions. The predetermined precision set is different from a predetermined precision set used for non-affine inter coding in the same video.

The affine motion model may be a four-parameter motion model or a six-parameter motion model. Where the affine motion model is a six-parameter motion model, the method may further include: reading, from the bitstream, information identifying a third motion vector predictor; reading, from the bitstream, a third motion vector difference having the identified precision; and generating a third control point motion vector from the third motion vector predictor and the third motion vector difference; wherein the affine motion model is characterized by the first control point motion vector, the second control point motion vector, and the third control point motion vector.

The information that identifies one of the plurality of precisions may be read from the bitstream on a block-by-block basis, allowing different blocks within a picture to use different precisions.

In some embodiments, the motion vector predictors are rounded to the identified precision. Each of the control point motion vectors may be generated by adding the corresponding motion vector difference to the respective motion vector predictor.

In some embodiments, a prediction of the current block is generated by: determining a respective sub-block motion vector for each of a plurality of sub-blocks of the current block using the affine motion model; and generating an inter prediction of each of the sub-blocks using the respective sub-block motion vector.

In some embodiments, the method further includes: reading from the bitstream a residual for the current block; and reconstructing the current block by adding the residual to the prediction of the current block.

Systems and methods are also described for adaptively selecting the precision of affine motion vectors and for performing motion estimation for affine motion models.

In additional embodiments, encoder and decoder systems are provided to perform the methods described herein. An encoder or decoder system may include a processor and a non-transitory computer-readable medium storing instructions for performing the methods described herein. Further embodiments include a non-transitory computer-readable storage medium storing a video encoded using any of the methods disclosed herein.

BRIEF DESCRIPTION OF THE DRAWINGS

FIGS. 3A-3E illustrate block partitions in a multi-type tree structure: quaternary partition (FIG. 3A); vertical binary partition (FIG. 3B); horizontal binary partition (FIG. 3C); vertical ternary partition (FIG. 3D); horizontal ternary partition (FIG. 3E).

FIG. 4A illustrates an affine model.

FIG. 4B illustrates sub-block-level motion derivation for affine blocks.

EXAMPLE NETWORKS FOR IMPLEMENTATION OF THE EMBODIMENTS

Figure 1A:
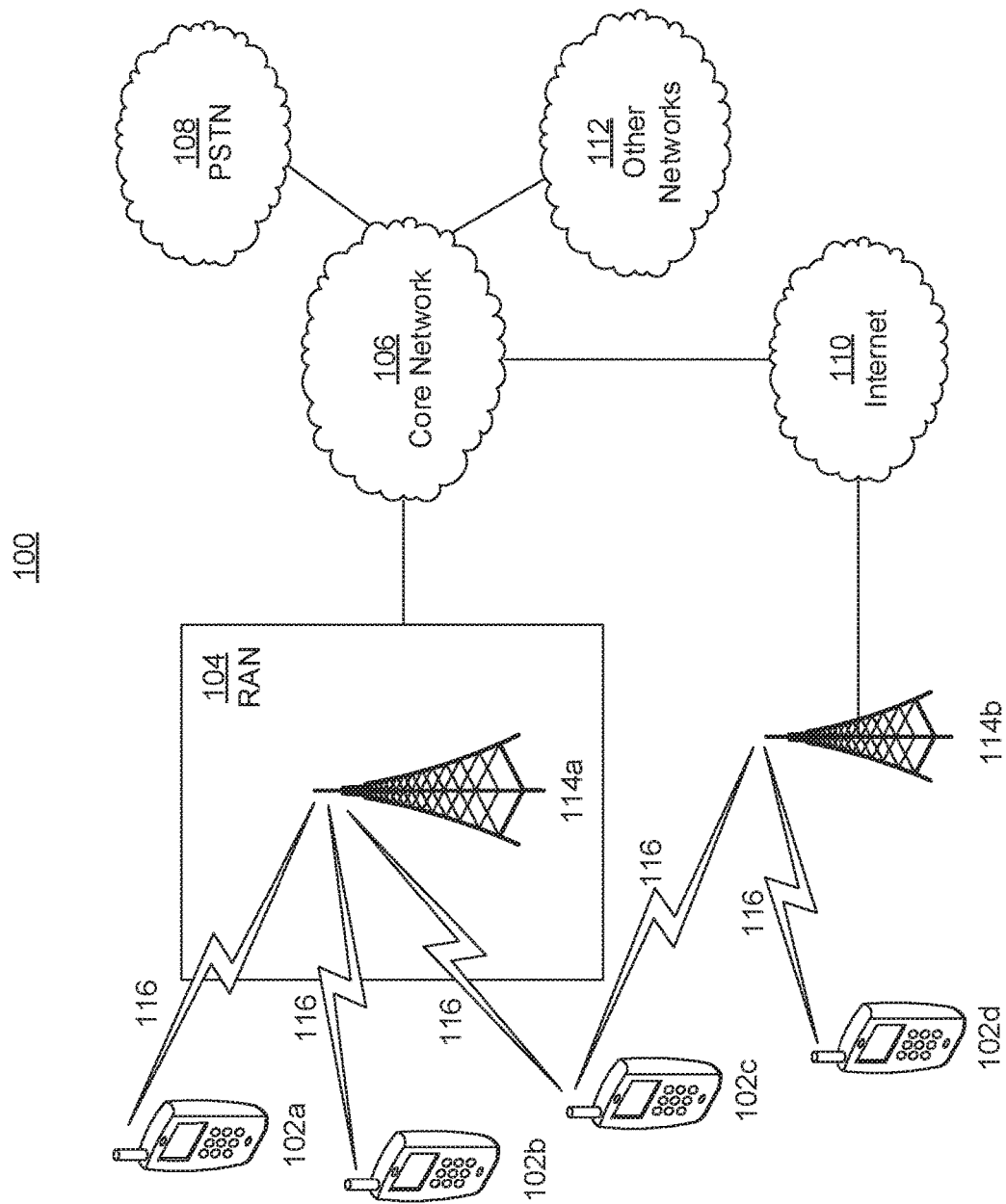
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
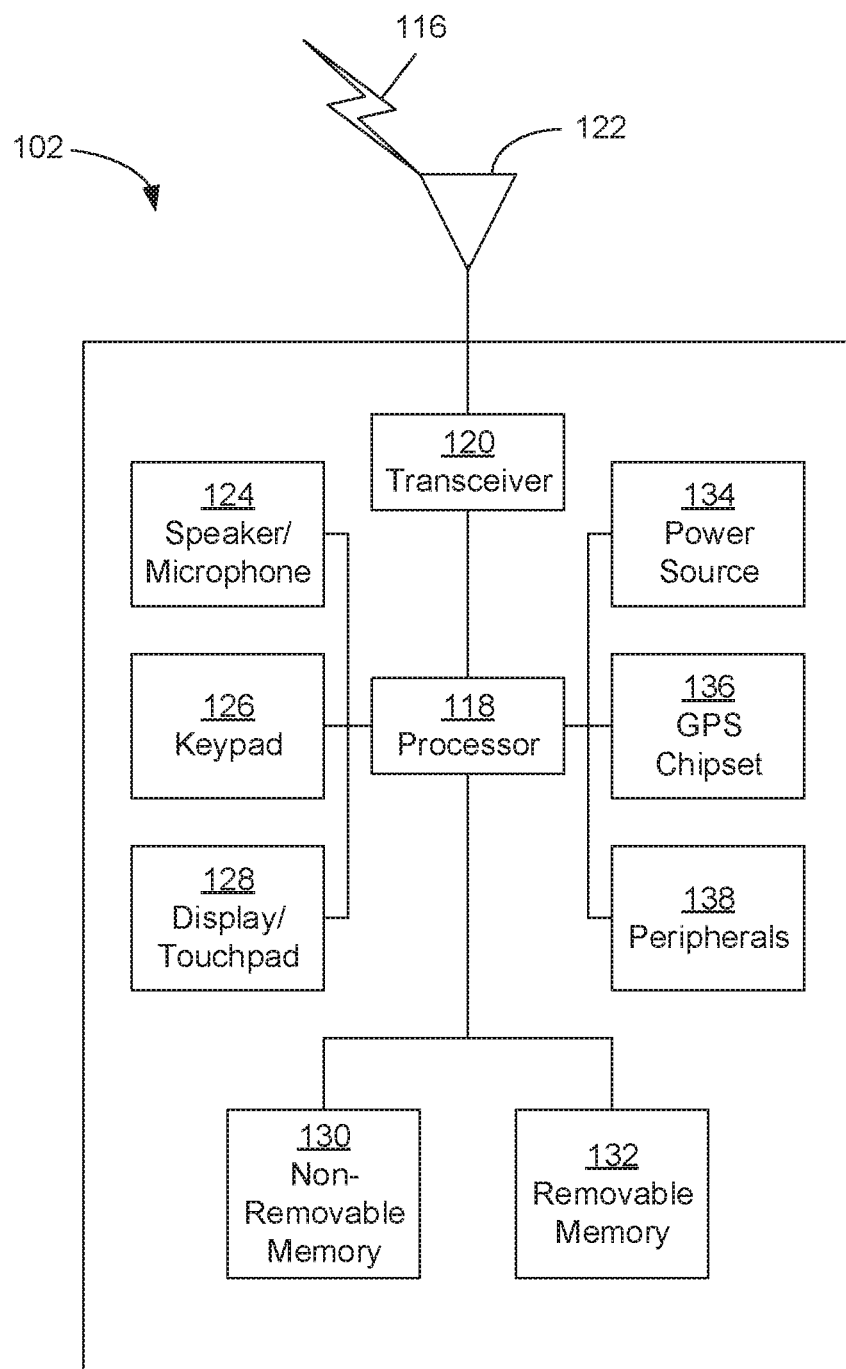
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

In view of FIGS. 1A-1B, and the corresponding description, one or more, or all, of the functions described herein may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Block-Based Video Coding.

Figure 2A:
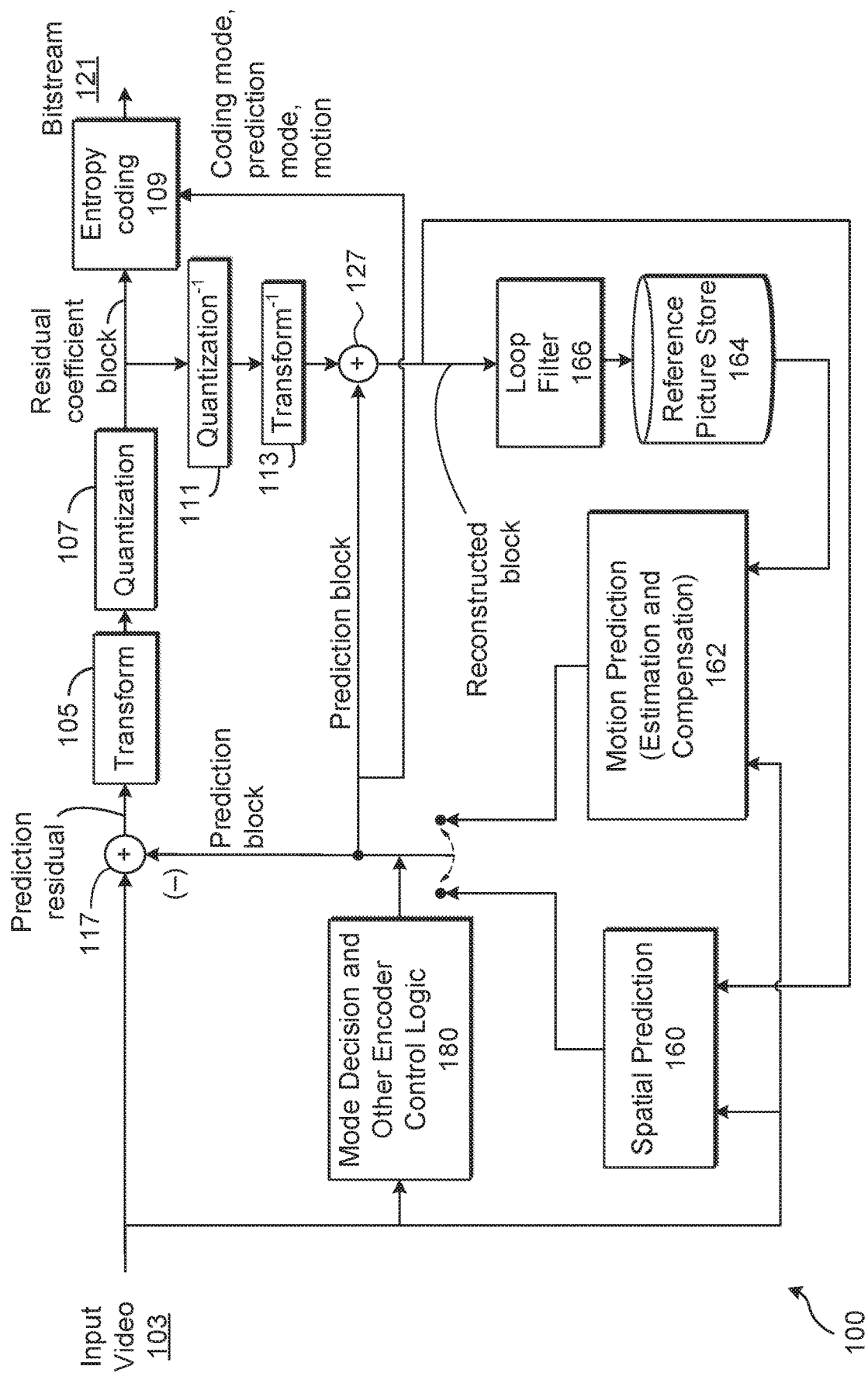
FIG. 2A is a functional block diagram of block-based video encoder, such as an encoder used for WC.

Like HEVC, the WC is built upon the block-based hybrid video coding framework. FIG. 2A gives the block diagram of an example of a block-based hybrid video encoding system. The input video signal 103 is processed block by block (called coding units (CUs)). In VTM-1.0, a CU can be up to 128×128 pixels. However, different from the HEVC which partitions blocks only based on quad-trees, in the VTM-1.0, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the WC-1.0 anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure. As shown in FIGS. 3A-3E, there are five splitting types, quaternary partitioning, horizontal binary partitioning, vertical binary partitioning, horizontal ternary partitioning, and vertical ternary partitioning. In FIG. 2A, spatial prediction (160) and/or temporal prediction (162) may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store (164) the temporal prediction signal comes. After spatial and/or temporal prediction, the mode decision block (180) in the encoder chooses the best prediction mode, for example based on the rate-distortion optimization method. The prediction block is then subtracted from the current video block (117); and the prediction residual is de-correlated using transform (105) and quantized (107). The quantized residual coefficients are inverse quantized (111) and inverse transformed (113) to form the reconstructed residual, which is then added back to the prediction block (127) to form the reconstructed signal of the CU. Further in-loop filtering, such as deblocking filter, may be applied (166) on the reconstructed CU before it is put in the reference picture store (164) and used to code future video blocks. To form the output video bit-stream 121, coding mode (inter or intra), prediction mode information, motion information, and quantized residual coefficients are all sent to the entropy coding unit (109) to be further compressed and packed to form the bit-stream.

Figure 2B:
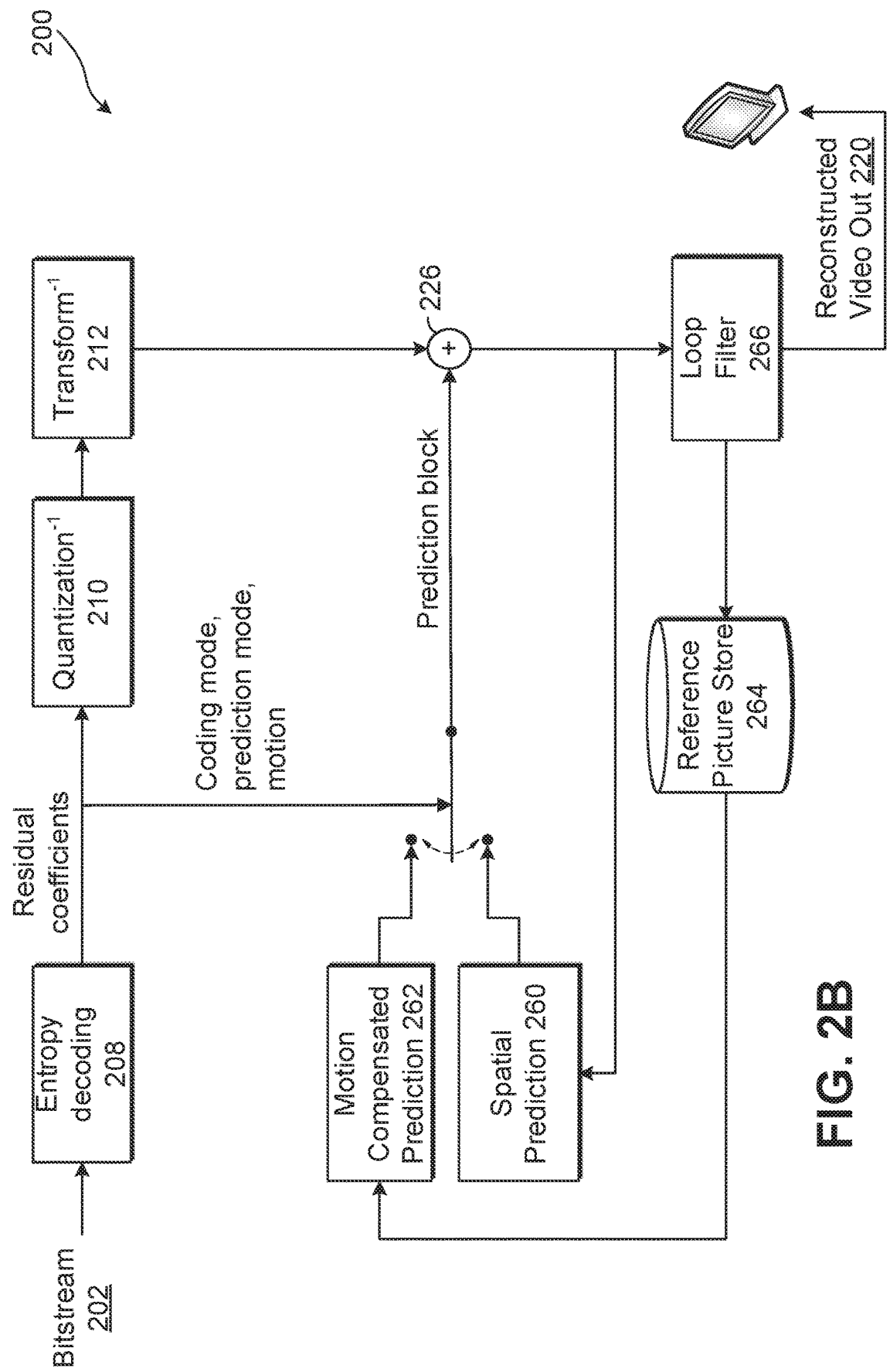
FIG. 2B is a functional block diagram of a block-based video decoder, such as a decoder used for VVC.

FIG. 2B gives a block diagram of an example of a block-based video decoder. The video bit-stream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video in reference picture store is then sent out to drive a display device, as well as used to predict future video blocks.

As mentioned earlier, the BMS-1.0 adheres to the same encoding/decoding workflow of the VTM-1.0 as shown in FIGS. 2A and 2B. However, several coding modules, especially the ones associated with temporal prediction, are further extended and enhanced. In the following, affine motion compensation as one inter coding tool that is included in the BMS-1.0 or the previous JEM is briefly described.

Affine Mode.

In HEVC, only a translation motion model is applied for motion compensated prediction. In the real world, on the other hand, there are many kinds of motion, e.g. zoom in/out, rotation, perspective motions and other irregular motions. In the BMS, a simplified affine transform motion compensated prediction is applied. A flag for each inter coded CU is signaled to indicate whether the translation motion or the affine motion model is applied for inter prediction.

Figure 4B:
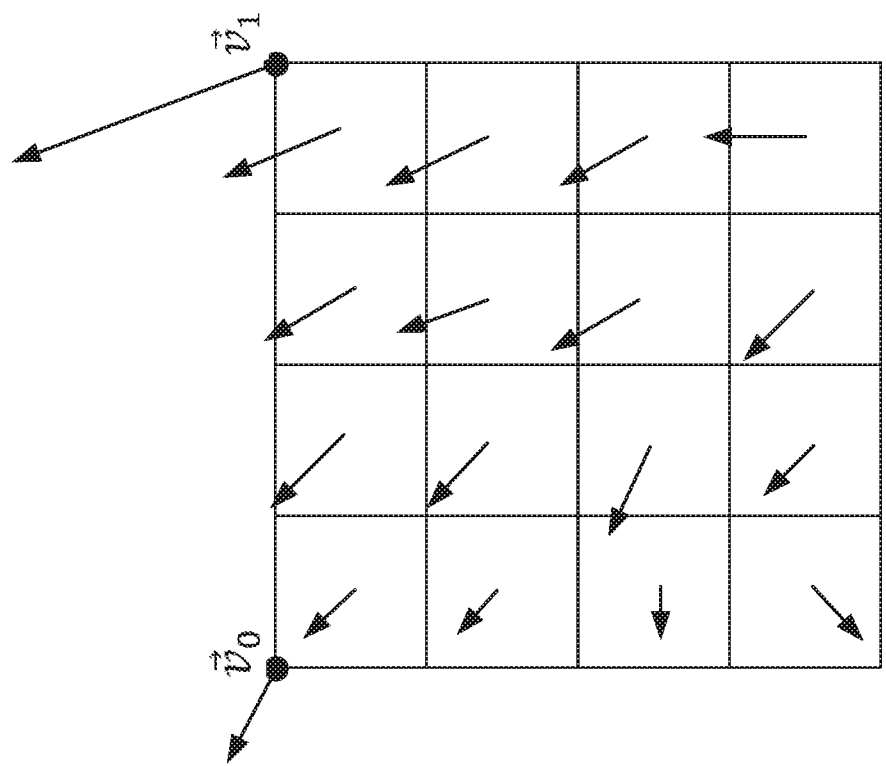
FIGS. 4A-4B illustrate a four-parameter affine motion model.
Figure 4A:
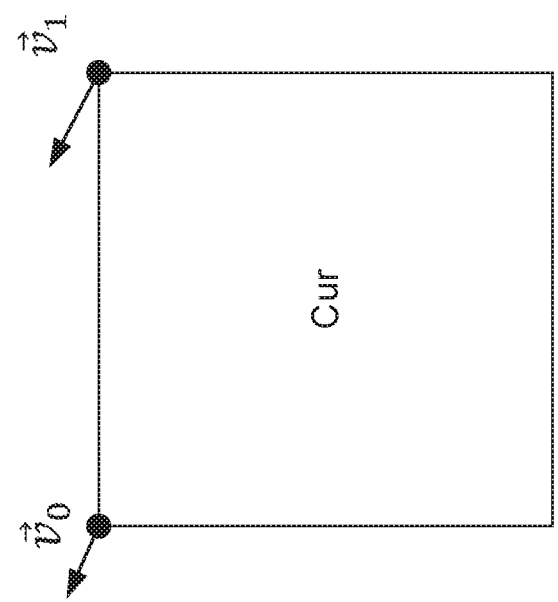

The simplified affine motion model is a four-parameter model: two parameters for translation movement in the horizontal and vertical directions, one parameter for zoom motion, and one parameter for rotational motion. The horizontal zoom parameter is equal to the vertical zoom parameter. The horizontal rotation parameter is equal to vertical rotation parameter. The four-parameter affine motion model is coded in BMS using two motion vectors as one pair at two control point positions defined at the top-left corner and the top-right corner of the current CU. As shown in FIG. 4A, the affine motion field of the block is described by two control point motion vectors ($V_0$, $V_1$). Based on the control point motion, the motion field ($v_x$, $v_y$) of an affine coded block is described as $$v_x = \frac{(v_{1x} - v_{0x})}{w} x - \frac{(v_{1y} - v_{0y})}{w} y + v_{0x} \quad (1)$$
$$v_y = \frac{(v_{1y} - v_{0y})}{w} x + \frac{(v_{1x} - v_{0x})}{w} y + v_{0y}$$

where ($v_{0x}$, $v_{0y}$) is motion vector of the top-left corner control point, and ($v_{1x}$, $v_{1y}$) is motion vector of the top-right corner control point, as shown in FIG. 4A. Additionally, when a block is coded in the affine mode, its motion field is derived based on the granularity of sub-blocks. Specifically, to derive the motion vector of each sub-block, the motion vector of the center sample of each sub-block (as shown in FIG. 4B) is calculated according to (1) and rounded to 1/16-pel accuracy. Then, the derived motion vectors will be used at the motion compensation stage to generate the prediction signal of each sub-block inside the current block. Additionally, the sub-block size that is applied for the affine motion compensation is calculated as $$\begin{cases} M = clip3\left(4, w, \frac{w}{4 \cdot \max(abs(v_{1x} - v_{0x}), abs(v_{1y} - v_{0y}))}\right) \\ N = clip3\left(4, h, \frac{h}{4 \cdot \max(abs(v_{2x} - v_{0x}), abs(v_{2y} - v_{0y}))}\right) \end{cases} \quad (2)$$

where ($v_{2x}$, $v_{2y}$) is motion vector of the bottom-left control point, w and h are CU width and CU height, as calculated per (1); M and N are the width and the height of the derived sub-block size.

The four affine model parameters may be estimated iteratively. Denote the MV pairs at step k as $\{(v_{0x}^k, v_{0y}^k), (v_{1x}^k, v_{1y}^k)\}$, original luminance signal I(i,j), the prediction luminance signal I'$_k$(i,j). The spatial gradient $g_x$(i,j) and $g_y$(i,j) are derived with a sobel filter applied on the prediction signal I'$_k$(i,j) in the horizontal and vertical direction, respectively. The derivative of Eq (1) is:

$$\begin{cases} dv_x^k(x, y) = c*x - d*y + a \\ dv_y^k(x, y) = d*x + c*y + b \end{cases} \quad (3)$$

where (a, b) are delta translation parameters and (c, d) are delta zoom and rotation parameters at step k.

$$\begin{cases} dv_{0x}^k = v_{0x}^{k+1} - v_{0x}^k = a \\ dv_{0y}^k = v_{0y}^{k+1} - v_{0y}^k = b \end{cases} \quad (4)$$

$$\begin{cases} dv_{1x}^k = (v_{1x}^{k+1} - v_{1x}^k) = c*w + a \\ dv_{1y}^k = (v_{1y}^{k+1} - v_{1y}^k) = d*w + b \end{cases} \quad (5)$$

Based on the optical flow equation, the relationship between the change of luminance and the spatial gradient and temporal movement is formulated as:

$$I'_k(i,j) - I(i,j) = g_x(i,j)*dv_x^k(i,i) + g_y(i,j)*dv_y^k(i,i) \quad (6)$$

Substitute $dv_x^k$(i,j) and $dv_y^k$(i,j) with Eq. (3), we get the equation for parameter (a, b, c, d).

$$I'_k(i,j) - I(i,j) = (g_x(i,j)*i + g_y(i,j)*j)*c + (-g_x(i,j)*j + g_y(i,j)*i)*d + g_x(i,j)*a + g_y(i,j)*b \quad (7)$$

Since all samples in the CU satisfy Eq. (7), the parameter set (a, b, c, d) can be solved using least square method. The MVs at two control points $\{(v_{0x}^{k+1}, v_{0y}^{k+1}), (v_{1x}^{k+1}, v_{1y}^{k+1})\}$ at step (k+1) can be solved with Eq. (4) and (5), and they are rounded to a specified precision (i.e. ¼ pel, i. Using the iteration, the MVs at two control points can be refined until it converges when parameters (a, b, c, d) are all zeros or the iteration times meets a pre-defined limit.

Figure 14:
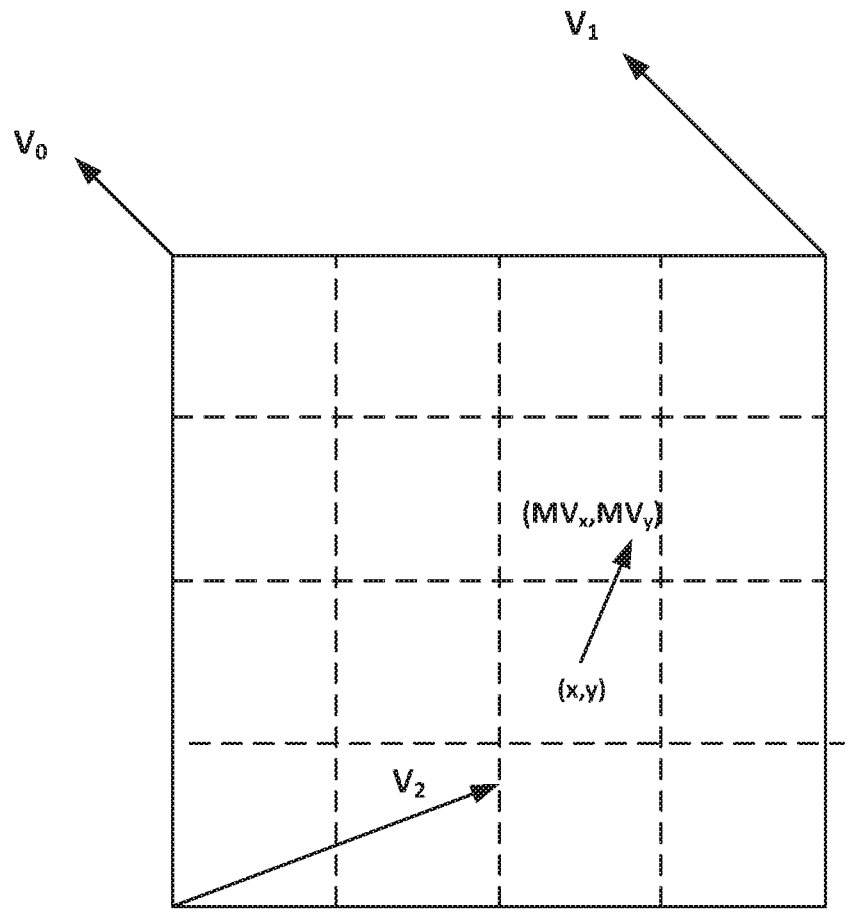
FIG. 14 illustrates a six-parameter affine mode: $V_0$, $V_1$, and $V_2$ are control points; $(MV_x, MV_y)$ is motion vector of the sub-block centered at position (x, y).

As shown in FIG. 14, there are three control points for 6-parameter affine coded CU: top-left, top-right and bottom left. The motion at top-left control point is translation motion, and the motion at top-right control point is related to rotation and zoom motion in horizontal direction, and the motion at bottom-left control point is related to rotation and zoom motion in vertical direction. For 4-parameter affine motion model, the rotation and zoom motion in horizontal and vertical are same. The motion vector of each sub-block ($MV_x$, $MV_y$) is derived using three MVs at control points as:

$$MV_x = v_{0x} + (v_{1x} - v_{0x})*\frac{x}{w} + (v_{2x} - v_{0x})*\frac{y}{h} \quad (8)$$

$$MV_y = v_{0y} + (v_{1y} - v_{0y})*\frac{x}{w} + (v_{2y} - v_{0y})*\frac{y}{h} \quad (9)$$

where (x, y) is the center position of sub-block, w and h are the width and height of CU.

Affine Merge Mode.

Figure 5:
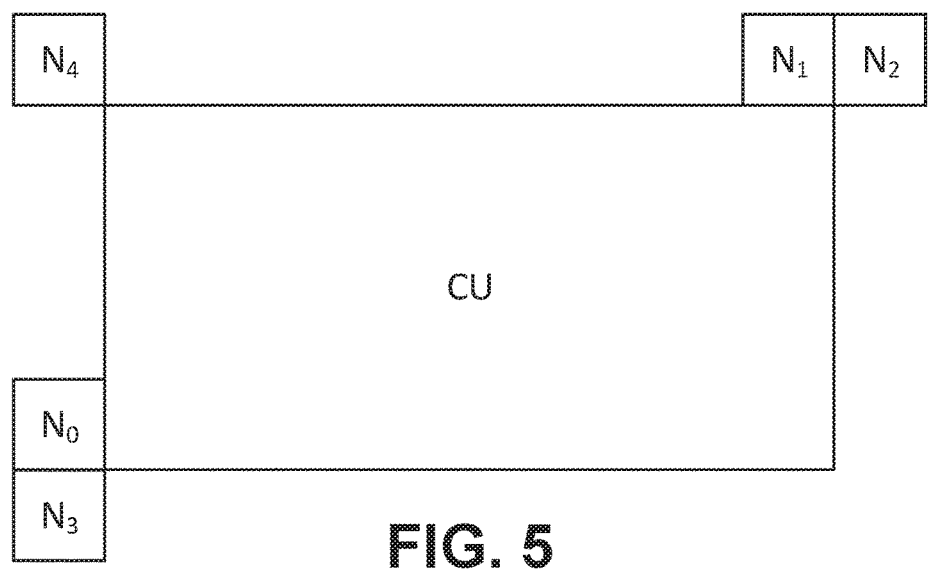
FIG. 5 illustrates affine merge candidates. The candidate availability checking order is $N_0$, $N_1$, $N_2$, $N_3$, $N_4$.
Figure 6:
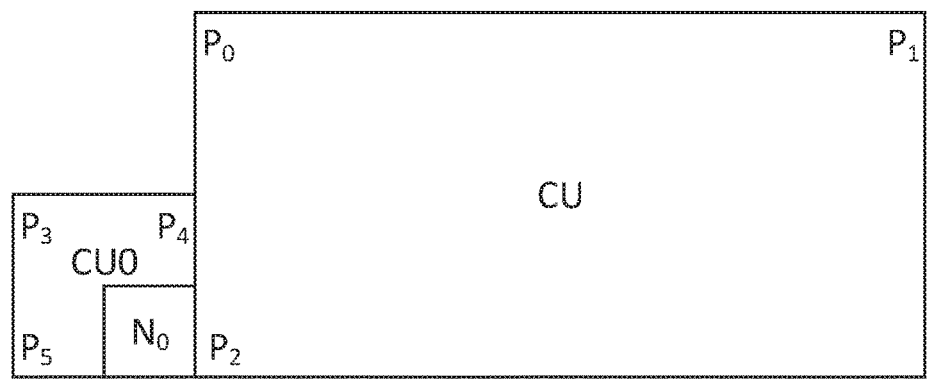
FIG. 6 illustrates motion vector derivation at control points for affine motion models.

If a CU is coded in the affine mode, two sets of motion vectors for those two control points for each reference list are signaled with predictive coding. The differences between the MV and its predictor are losslessly coded, and this signaling overhead is non-trivial, especially at low bitrate. In order to reduce the signaling overhead, the affine merge mode is also applied in BMS by considering the local continuity of the motion field. The motion vectors at two control points of a current CU are derived with the affine motion of its affine merge candidate selected from its neighboring blocks. If the current CU is coded with affine merge mode, there are five neighboring blocks as shown in FIG. 5 are checked in the order from $N_0$ to $N_4$. And the first affine-coded neighboring block will be used as an affine merge candidate. For example, as shown in FIG. 6, current CU is coded as affine merge mode, and its bottom-left neighboring block ($N_0$) is selected as the affine merge candidate. The width and height of the CU containing block $N_0$ are denoted as nw and nh. The width and height of the current CU are denoted as cw and ch. The MV at position $P_i$ is denoted as $(v_{ix}, v_{iy})$. The MV $(v_{0x}, v_{0y})$ at control point $P_0$ is derived as:

$$v_{0x} = v_{3x} + (v_{4x} - v_{3x}) * \frac{(x_0 - x_3)}{nw} - (v_{4y} - v_{3y}) * \frac{(y_0 - y_3)}{nw} \quad (10)$$

$$v_{0y} = v_{3y} + (v_{4y} - v_{3y}) * \frac{(x_0 - x_3)}{nw} + (v_{4x} - v_{3x}) * \frac{(y_0 - y_3)}{nw} \quad (11)$$

The MV $(v_{1x}, v_{1y})$ at control point $P_1$ is derived as:

$$v_{1x} = v_{0x} + (v_{4x} - v_{3x}) * \frac{cw}{nw} \quad (12)$$

$$v_{1y} = v_{0y} + (v_{4y} - v_{3y}) * \frac{cw}{nw} \quad (13)$$

The MV $(v_{2x}, v_{2y})$ at control point $P_2$ is derived as:

$$v_{2x} = v_{0x} - (v_{4y} - v_{3y}) * \frac{ch}{nw} \quad (14)$$

$$v_{2y} = v_{0y} + (v_{4x} - v_{3x}) * \frac{ch}{nw} \quad (15)$$

After the MVs at two control points ($P_0$ and $P_1$) are derived, the MV of each sub-block within the current CU is derived as described above, and this derived sub-block MV can be used for sub-block based motion compensation and temporal motion vector prediction for future picture coding.
Affine MV Prediction.

For those non-merge affine coded CUs, the signaling of MVs at control points is costly and predictive coding is used to reduce signaling overhead. In BMS, the affine MV predictor is generated from the motion of its neighboring coded blocks. There are two kinds of predictors for the MV prediction of an affine coded CU: (a) the generated affine motion from neighboring blocks of control points; (b) the translation motion used for conventional MV prediction, and it is used only when the number of affine predictors by (a) is not enough (fewer than 2 in BMS).

Figure 7:
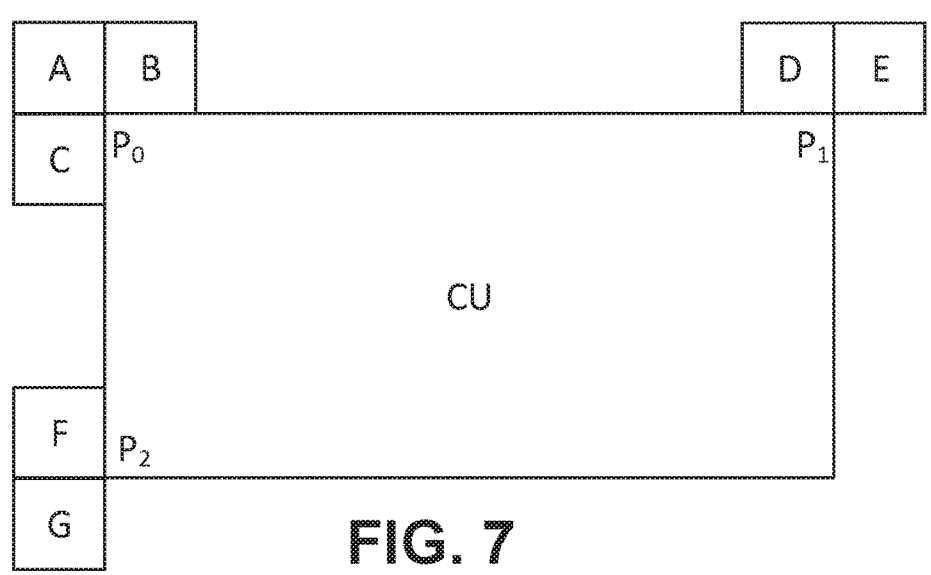
FIG. 7 illustrates affine motion vector predictor construction from motion vectors in blocks {A,B,C}, {D,E} and {F,G}.
Figure 8:
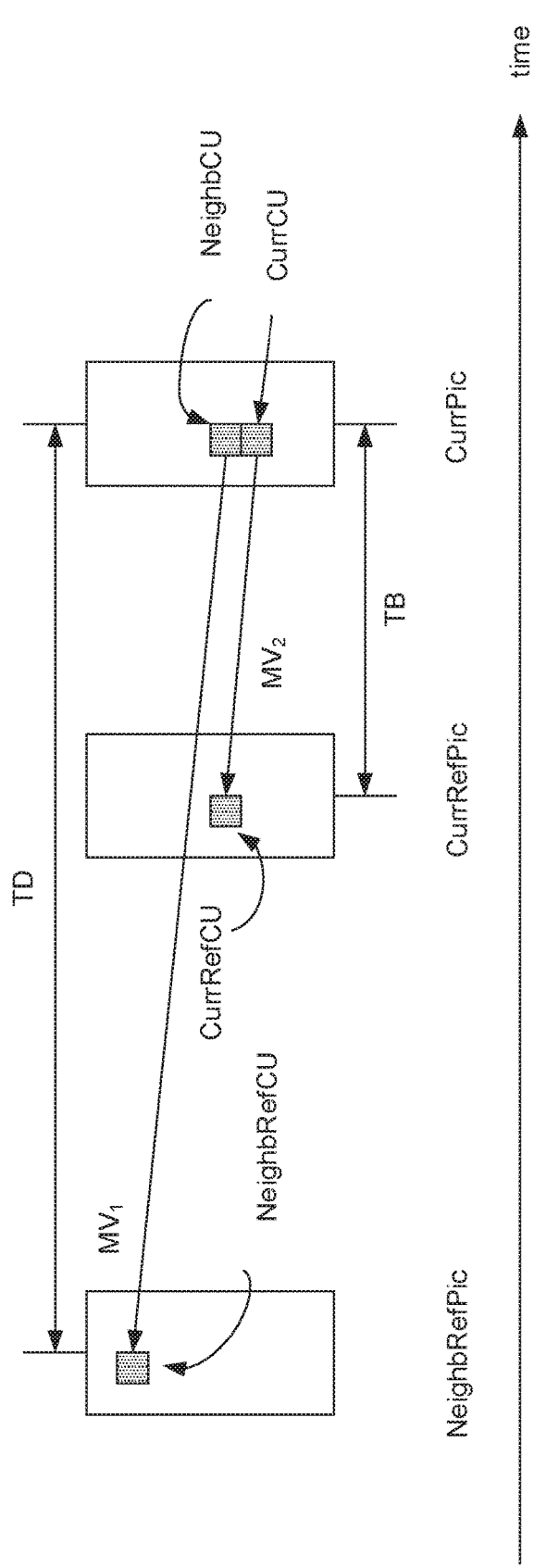
FIG. 8 illustrates an example of motion vector (MV) temporal scaling for affine MV predictor generation.

Three sets of MVs are used to generate multiple affine motion predictors. As shown in FIG. 7, three MV sets are: (1) MV from the neighboring blocks {A, B, C} at corner $P_0$ consists of set S1, denoted as $\{MV_A, MV_B, MV_C\}$; (2) MV from the neighboring blocks {D, E} at corner $P_1$ consists of set S2, denoted as $\{MV_D, MV_E\}$; (3) MV from the neighboring blocks {F, G} at corner $P_2$ consists of set S3, denoted as $\{MV_F, MV_G\}$. The MV from a neighboring block is derived in the following way. First check the spatial neighboring block; if the neighboring block is an inter coding block, the MV will be used directly and the reference picture of the neighboring block is the same as the reference picture of the current CU; or the MV will be scaled according to temporal distance if the reference picture of the neighboring block is different from the reference picture of the current CU. As shown in FIG. 8, denote the temporal distance between the current picture and the reference picture of current CU as TB, and the temporal distance between current picture and the reference picture of neighboring block as TD. The $MV_1$ of the neighboring block is scaled as:

$$MV_2 = MV_1 \cdot \frac{TB}{TD} \quad (16)$$

$MV_2$ is used in the motion vector set.

If the neighboring block is not an inter coding block, then the collocated block in the collocated reference picture will be checked. If the temporal collocated block is an inter coding block, the MV is scaled with Eq. (18) based on temporal distance. If the temporal collocated block is not an inter coding block, then the MV in that neighboring block is set to zero.

After three sets of MVs are obtained, the affine MV predictor is produced by selecting one MV from each of the three sets of MVs. The size of S1, S2 and S3 is 3, 2, 2, respectively. In total, we can get 12 (3×2×2) combinations. In BMS, the candidate will be discarded if the zoom or rotation related parameters represented by three MVs is larger than a predefined threshold. Denote one combination as ($MV_0$, $MV_1$, $MV_2$) for three corners of CU: top-left, top-right, and bottom-left. The following condition is checked.

$$(|(v_{1x}-v_{0x})|>T*w) \text{ or } (|(v_{1y}-v_{0y})|>T*h) \quad (17)$$

$$\text{or } (|(v_{2x}-v_{0x})|>T*w) \text{ or } (|(v_{2y}-v_{0y})|>T*h)$$

where T is (½). If the condition is satisfied, which means the zooming or rotation is too big, then the candidate is discarded.

All remaining candidates are sorted in BMS. A triplet of three MVs represents a 6-parameter motion model including translation, zoom and rotation in horizontal and vertical directions. The ordering criteria is the difference between this 6-parameter motion model and the 4-parameter motion model represented by ($MV_0$, $MV_1$). The candidate with a smaller difference will have a smaller index in the ordered candidate list. The difference between the affine motion represented by ($MV_0$, $MV_1$, $MV_2$) and the affine motion model represented by ($MV_0$, $MV_1$) is evaluated with Eq. (18).

$$D=|(v_{1x}-v_{0x})*h-(v_{2y}-v_{0y})*w|+|(v_{1y}-v_{0y})*h+(v_{2x}-v_{0x})*w| \quad (18)$$

Affine MV Coding.

If a CU is coded as an affine mode, it can be affine merge mode or affine non-merge mode. For the affine merge mode, described above, the affine MVs at those control points are derived from affine MVs of its neighboring affine coded CU. Therefore, there is no need to signal MV information for the affine merge mode. For affine non-merge mode, the MVs at control points are coded with differential coding. The MV predictors are generated using the neighboring MVs as described above, and the difference between a current MV and its predictor is coded. The MV difference to be signaled is referred to as MVD. The affine four-parameter model has two control points, so two MVDs are used for signaling for uni-prediction, and four MVDs are used for signaling for bi-prediction. The affine six-parameter model has three control points, so three MVDs are used for signaling for uni-prediction, and six MVDs are used for signaling for bi-prediction. The MVD is difficult for compression because it is a two-dimensional vector (horizontal and vertical components) and is lossless coded. In the current VVC design (VTM-1.0/BMS-1.0), the precision of MVD for signaling is quarter-pixel precision.

Adaptive MVD Precision.

For the CU coded as non-merge and non-affine inter mode, the MVD between the current CU's MV and its predictor can be coded in different resolutions. It can be either ¼-pel, 1-pel or 4-pel precision. ¼-pel is fractional precision. 1-pel and 4-pel both belong to integer precision. The precision is signaled with two flags for each CU to indicate the MVD precision. The first flag is to indicate whether the precision is ¼-pel or not. If the precision is not ¼-pel, then the second flag is signaled to indicate it is 1-pel or 4-pel precision. In motion estimation, usually the delta MV will be searched around an initial MV which is treated as the starting position. The starting position may be selected from its spatial and temporal predictors. For easy implementation, the starting MV is rounded to the precision for MVD signaling, then only those MVD candidates having the desired precision will be searched. The MV predictor is also rounded to the MVD precision. In VTM/BMS reference software, the encoder will check the rate distortion (RD) cost for different MVD precision and will select the optimal MVD precision with minimal RD cost. The RD cost is calculated by the weighted sum of sample value distortion and the coding rate, and it is a measurement of coding performance. The coding mode with lower RD cost will give a better overall coding performance. In order to reduce the signaling overhead, the MVD precision related flag is signaled only when signaled MVD is not zero. If signaled MVD is zero, it is inferred as ¼ pel precision.

MVD Coding.

In WC, the MVD entropy coding method is the same for both affine and non-affine coding mode. It codes two components independently. The sign of MVD of each component is coded with 1 bit. The absolute value is coded in two parts: (1) The value 0 and 1 are coded with flags. The first flag is to indicate if the absolute value is greater than 0; if the value is greater than 0, the second flag is to indicate if the absolute value is greater than 1. (2) If the absolute value v is greater than 1, then the remaining part (v-2) is binarized with the first order Exponential-Golomb (EG) codes, and these binarized bins are coded in fixed length coding. For example, the remaining part (v-2) binarization using first order EG codes is listed in Table 1.

TABLE 1

Binarization for absolute value of MVD of one component using the first order EG codes

| absolute value (v-2) | Binarization for coding |
|---|---|
| 0 | 00 |
| 1 | 01 |
| 2 | 1000 |
| 3 | 1001 |

TABLE 1-continued

Binarization for absolute value of MVD of one component using the first order EG codes

| absolute value (v-2) | Binarization for coding |
|---|---|
| 4 | 1010 |
| 5 | 1011 |
| 6 | 110000 |
| ... | ... |

The codeword length of EG codes with different orders for the same value to be coded may be different. The order is smaller, codeword length for small values is usually shorter, while codeword length for large values is longer. For affine coding mode, the MVD of those control points may have different statistics. The EG codes with the same order may not be optimal for the MVD coding of all control points.

Issues Addressed in Some Embodiments.

As it is described above, the MVD signaling brings a non-trivial signaling overhead for explicit affine coded CU compared to inter CU coded with translation motion model because it has more MVDs to be signaled: two sets of MVDs for a 4-parameter affine model and 3 MVDs for a 6-parameter affine model. Adaptive MVD precision for signaling is helpful to get a better trade-off between the efficiency of motion compensation and signaling overhead. However, the usage of motion vectors at control points in affine model are different from the motion vector for conventional translation motion model: the MVs at control points are not used directly for motion compensation; they are used to derive sub-block's MV, and the sub-block's MV is used for motion compensation for that sub-block.

The motion estimation (ME) process for an affine motion model described above is different from a motion searching method for conventional translation motion model in VTM/BMS. The ME process used to find the optimal MVs at two control points is based on optical flow field estimation. For each iteration, the delta MV derived from optical flow estimation is different, and it is difficult to control the step size in each iteration. In contrast, ME for the translation motion model to find an optimal MV for a coding block is usually a position-by-position searching method within a certain range. Within a searching range around a starting MV, it can evaluate and compare the ME cost for each possible position such as in the full search scheme, then select the optimal position having the minimal ME cost. The ME cost is usually evaluated as a weighted sum of the prediction error and the bits for MV related signaling including reference picture index and MVD. The prediction error can be measured by the sum of absolute difference (SAD) between original signal and prediction signal of the coding block.

In this determinative ME process for a translation motion model, there are many fast searching methods to adaptively adjust the search step size during iterations. For example, the searching can begin with a coarse step size within the search window. Once it obtains an optimal position at a coarse step size, the step size can be reduced, and the search window is also reduced to a smaller window centered at the last optimal position obtained from previous search window. This iterative search can be terminated when the search step size is reduced to a value no greater than a pre-defined threshold, or the total search times meets a pre-defined threshold.

The ME process for an affine model is different from the ME process for a translation model. The present disclosure describes ME methods for an affine model for different MVD precision.

Overview of Some Embodiments

To provide motion estimation for an affine model, the present disclosure describes adaptive MVD precision methods to improve the coding efficiency of affine motion models. Some embodiments provide an improved trade-off between signaling and motion-compensated prediction efficiency. Determination methods for adaptive MVD precision are also proposed.

In some embodiments, the MVD precision for an affine model is adaptively selected from a multiple-precision-set for two control points. The precisions for the MVD at different control points may be different.

In some embodiments, MV searching methods for an affine model at different MVD precisions are proposed to improve the accuracy and reduce the encoding complexity.

In some embodiments, the affine control point motion vector predictor (MVP) and MV are kept in high precision, but the MVD is rounded to low precision. This allows the accuracy of motion compensation using the high precision MV to be improved.

To ease explanation, the use of a 4-parameter affine motion model is given as an example in following discussion. But the proposed methods can also be directly extended to a 6-parameter affine motion model.

Adaptive MVD Precision for an Affine Model.

In VTM/BMS, the MVD at the control point for an affine model is always signaled in ¼-pel precision. The fixed precision cannot provide a good trade-off between MVD signaling overhead and the efficiency of affine motion compensation. By increasing the precision of MVD at those control points, the MV derived with from Eq. (1) for each sub-block will be more accurate. Therefore, the motion prediction can be improved. But it will use more bits for MVD signaling. In this disclosure, methods for adaptive MVD precision at control points are proposed. The motion of the top-left control point is related to the translation motion for each sub-block within that CU, and the motion difference between two control points is related to zoom and rotation motion for each sub-block. Those blocks coded with an affine motion model may have different motion characteristics. Some affine blocks may have translation and rotation motion in a high precision, and some affine blocks may have translation motion in a low precision. In some embodiments, the translational motion and the rotation/zoom motion of an affine block may have different precisions. Based on this, some example embodiments signal different precisions for MVD coding at different control points.

Signaling the precision for each control point separately will increase the signaling overhead for affine coded CU. One embodiment is to signal the precision of two control points jointly. Only those frequently used combinations will be signaled. For example, the precision pair (prec0, prec1) may be used to indicate precision "prec0" for the top left control point and precision "prec1" for the top right control point. Example embodiments use the following four precision sets:

S1{(1-pel, ¼-pel), (¼-pel, ¼-pel)},
S2{(1-pel, ¼-pel), (¼-pel, ¼-pel), (¼-pel, ⅛-pel)},
S3{(1-pel, ¼-pel), (¼-pel, ¼-pel), (⅛-pel, ⅛-pel)}, and
S4{(1-pel, ¼-pel), (¼-pel, ¼-pel), (¼-pel, ⅛-pel), (⅛-pel, ⅛-pel)}.

(¼-pel, ¼-pel) precision is used for affine blocks as a normal precision. (1-pel, ¼-pel) is used for affine blocks that have translational motion in a low precision, but rotation/zoom still have a normal precision. (¼-pel, ⅛-pel) is used for affine blocks that have rotation/zoom in a high precision. (⅛-pel, ⅛-pel) is used for affine blocks that have both translational motion and rotation/zoom in a high precision. The precision set can be signaled at, for example, the sequence parameter set, picture parameter set or slice header.

In some embodiments, the precision of one control point will apply to the MVD in two lists if the current affine CU is coded with bi-prediction mode. In some embodiments, in order to reduce the signaling redundancy, the precision is only signaled if the MVD at that control point is not zero. If the MVD is zero at the control point, then there is no need to signal the precision information for that control point because the precision does not take any effect on an MVD of zero. For example, if the MVD at the top-left is zero, then (1-pel, ¼-pel) precision will not be valid for current CU. Therefore, in this case, there is additional precision signaling if the precision set is S1. (¼-pel, ¼-pel) and (⅛-pel, ⅛-pel) are valid if the precision set is S3. The precision for an MVD of zero may be inferred as a default precision such as (¼-pel, ¼-pel). Another embodiment may always signal precision even when the MVD is zero because it may lead to a high precision MV from its predictor. For example, the MV predictor is derived from neighboring affine coded CU. The high precision will result in a high precision MV predictor, therefore the final MV precision is high.

Table 2, Table 3, Table 4, and Table 5 are proposed for the binarization of those precision sets, and the binarized bin will be coded.

TABLE 2

Binarization for S1

| Precision | Binarization |
| --- | --- |
| (1-pel, 1/4-pel) | 1 |
| (1/4-pel, 1/4-pel) | 0 |

TABLE 3

Binarization for S2

| Precision | Binarization |
| --- | --- |
| (1-pel, 1/4-pel) | 1 |
| (1/4-pel, 1/4-pel) | 00 |
| (1/4-pel, 1/8-pel) | 01 |

TABLE 4

Binarization for S3

| Precision | Binarization |
| --- | --- |
| (1-pel, 1/4-pel) | 1 |
| (1/4-pel, 1/4-pel) | 00 |
| (1/8-pel, 1/8-pel) | 01 |

TABLE 5

Binarization for S4

| Precision | Binarization |
| --- | --- |
| (1-pel, 1/4-pel) | 1 |
| (1/4-pel, 1/4-pel) | 000 |
| (1/4-pel, 1/8-pel) | 001 |
| (1/8-pel, 1/8-pel) | 01 |

Figure 9:
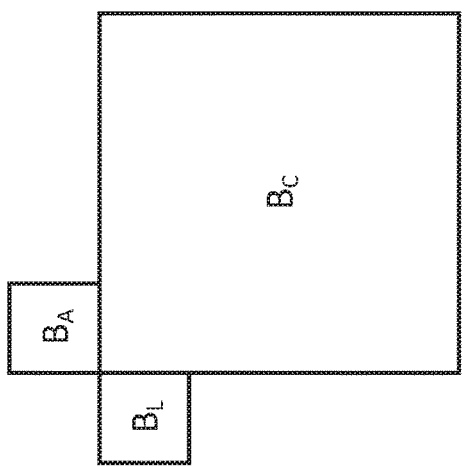
FIG. 9 illustrates neighboring blocks used for context derivation for block $B_C$.

For the precision coding, we use S3 as an example. There are two bins to be encoded for S3 set after binarization according to Table 4. The second bin is only coded when the first bin is 0. The bin will be coded with context-adaptive binary arithmetic coding (CABAC). The context for one bin in CABAC is used to record the probability of zero or one. The context for the first bin can be derived from its left and above neighbors as shown in FIG. 9. We define two functions: (1) Model(CU) to indicate if the motion model of CU is an affine model or not; (2) Prec(CU) to indicate if precision (1-pel, ¼-pel) is used for the CU or not.

$$Model\ (CU) = \begin{cases} 1 & \text{if } (CU \text{ is affine model coded)} \\ 0 & \text{otherwise} \end{cases} \quad (19)$$

$$Prec(CU) = \quad (20)$$
$$\begin{cases} 1 & \text{if } (Model\ (CU) == 1 \text{ and the precision is } (1\text{-}pel, 1/4\text{-}pel)) \\ 0 & \text{otherwise} \end{cases}$$

We compare the precision of neighboring CU and current CU and get two flags: equalPrec(BL), equalPrec($B_A$) as evaluated with Eq. (21), (22).

$$equalPrec(B_L) = \quad (21)$$
$$\begin{cases} 1 & \text{if } (Prec(B_L) == 1 \text{ and } Prec(B_C) == 1) \\ 0 & \text{otherwise} \end{cases}$$

$$equalPrec(B_A) = \quad (22)$$
$$\begin{cases} 1 & \text{if } (Prec(B_A) == 1 \text{ and } Prec(B_C) == 1) \\ 0 & \text{otherwise} \end{cases}$$

The index of the context for the first bin is constructed as Eq. (23).

$$\text{Context\_idx}(B_C) = equalPrec(B_A) + equalPrec(B_L) \quad (23)$$

The second bin may be coded using one fixed context. Or it can coded with 1 bit fixed length coding.

Alternatively, the 1-pel precision for top left control point can be replaced by ½-pel precision in the above precision pair based signaling scheme.

Another embodiment is to signal the precision for each control point separately. For example, we will signal one precision selected from the set {1-pel, ¼-pel, ⅛-pel} for the top-left control point, and signal one precision selected from the set {½-pel, ¼-pel, ⅛-pel} for the top-right control point. The reason that the precision sets of two control points are different is that the 1-pel precision is too coarse for the top-right MV that is related to rotation and zoom motion because rotation and zoom motion has a warping effect that is more complex than translation motion. If an affine block has a translation motion in a low precision, then the top left control point can select 1-pel precision; if the affine block has a translation motion in a high precision, the top left control point can select ⅛-pel precision. If the affine block has rotation or zoom motion in a high precision, then the top right control point can select ⅛-pel precision. Based on the statistics, the following binarization table (Table 6, Table 7) can be used to code the precision selected for two control points. The binary codes are codewords and they can be coded with different entropy coding methods such as CABAC. At the decoder side, the affine MV predictor at each control point may be rounded to the precision that MVD has, then is scaled to a high precision for MV filed storage (e.g. 1/16-pel in WC). The decoded MVD is first scaled to a high precision for MV filed storage based on its precision. Then the scaled MVD is added to the MV predictor to get reconstructed MV in the precision used for motion field storage. The reconstructed MV at control points will be used to derive each sub-block's MV with Eq. (1) for each sub-block's motion compensation to get the sample value prediction for that sub-block.

TABLE 6

Binarization for the precision coding of top left control point

| Precision | Binarization |
| --- | --- |
| 1-pel | 1 |
| 1/4-pel | 00 |
| 1/8-pel | 01 |

TABLE 7

Binarization for the precision coding of top right control point

| Precision | Binarization |
| --- | --- |
| 1/2-pel | 00 |
| 1/4-pel | 1 |
| 1/8-pel | 01 |

In another embodiment, the precision set for both control points may be the same such as {½-pel, ¼-pel, ⅛-pel}, but the binarization of precision coding for two control points may be different. An example of the binarization of precision coding for two control points is proposed in Table 8.

TABLE 8

Binarization for the precision coding of control points

| Precision | Binarization of top left control point | Binarization of top right control point |
| --- | --- | --- |
| 1/2-pel | 1 | 00 |
| 1/4-pel | 00 | 1 |
| 1/8-pel | 01 | 01 |

In some embodiments, the precision control for control points is only applied to those large CUs to save signaling overhead because usually the affine motion model is more frequently used for large CUs. For example, in some embodiments the MVD precision for control points may only be signaled when CU has an area greater than a threshold (e.g. 16×16). For small CUs, the precision may be inferred as (¼-pel) for both control points.

In some embodiments, the precision set is changed at the picture level. In random access configuration, there are different temporal layers, and different quantization parameters (QP) may be used at different layers. For example, for low temporal-layer pictures with small QP, it may have more precision options and may prefer high precision such as ⅛-pel. And we may use precision set {½-pel, ¼-pel, ⅛-pel}. For high temporal layer pictures with large QP, it may have fewer precision options and may prefer low precision such as 1-pel. And we may use precision set {1-pel, ¼-pel} or {1-pel, ½-pel, ¼-pel}.

For a 6-parameter affine model, the motion at top-left is related to translation motion, the motion difference between top-right and top-left is related to rotation and zoom in horizontal direction, and the motion difference between bottom-left and top-left is related to rotation and zoom in vertical direction. We specify the triplet precision (p0, p1, p2) for 6-parameter affine model, where p0 and p1 and p2 are precision for top-left, top-right and bottom-left control points. One embodiment is to set the same precision for MVD signaling at both top-right and bottom-left control points. For example, the precision for three control points may be one of the set {(1-pel, ¼-pel, ¼-pel), (¼-pel, ¼-pel, ¼-pel), (⅛-pel, ⅛-pel, ⅛-pel)}. Another embodiment is to set different precision for top-right and bottom-left control points. In order to save signaling overhead, it is better to reduce the option of precision set as much as possible. In some embodiments, the precision set is selected based on the shape of CU. If the width is equal to the height (i.e. square CU), the precision for top-right and bottom-left may be the same, for example, the precision set is {(1-pel, ¼-pel, ¼-pel), (¼-pel, ¼-pel, ¼-pel), (⅛-pel, ⅛-pel, ⅛- pel)}. If the width is greater than the height (i.e. long CU), the precision for top-right control point may be equal to or higher than the precision for bottom-left control point, for example, the precision set is {(1-pel, ¼-pel, ¼-pel), (¼-pel, ¼-pel, ¼-pel), (⅛-pel, ⅛-pel, ¼-pel)}. If the width is smaller than the height (i.e. tall CU), the precision for top-right control point may be equal to or lower than the precision for bottom-left control point, for example, the precision set is {(1-pel, ¼-pel, ¼-pel), (¼-pel, ¼-pel, ¼-pel), (⅛-pel, ¼- pel, ⅛-pel)}.

Figure 18:
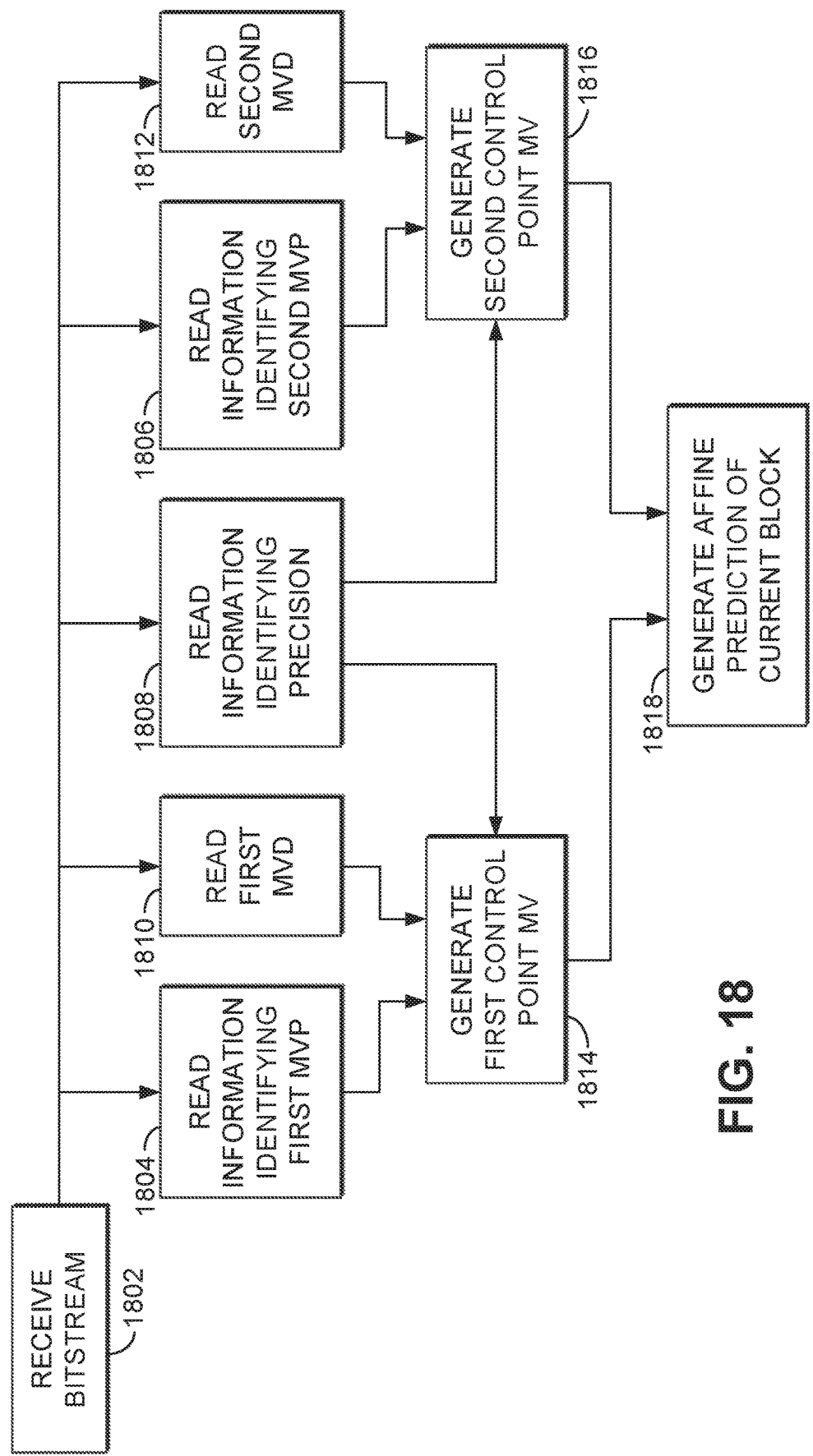
FIG. 18 illustrates a method performed by a decoder in some embodiments.

An example of a method performed by a decoder in some embodiments is illustrated in FIG. 18. The decoder receives the bitstream (block 1802) and reads, from the bitstream: information identifying at least a first motion vector predictor (block 1804) and a second motion vector predictor (block 1806), information identifying one of a plurality of precisions in a predetermined precision set (block 1808), and at least a first motion vector difference (block 1810) and a second motion vector difference (block 1812). The first and second motion vector differences have the precision identified by the information read at block 1808. The syntax and semantics by which the information is coded in the bitstream may differ for different embodiments. The decoder generates at least a first control point motion vector from the first motion vector predictor and the first motion vector difference (block 1814) and a second control point motion vector from the second motion vector predictor and the second motion vector difference (block 1816). The decoder then generates a prediction of the current block using an affine motion model (block 1818). The affine motion model is characterized by at least the first control point motion vector and the second control point motion vector.

Motion Estimation for Affine Motion Model with Adaptive MVD Precision.

When adaptive MVD precision is applied for two affine control points, the encoder operates to determine the optimal precision, which will affect the coding performance of affine motion model. The encoder also operates to apply a good motion estimation method with a given precision to determine affine model parameters.

Figure 10:
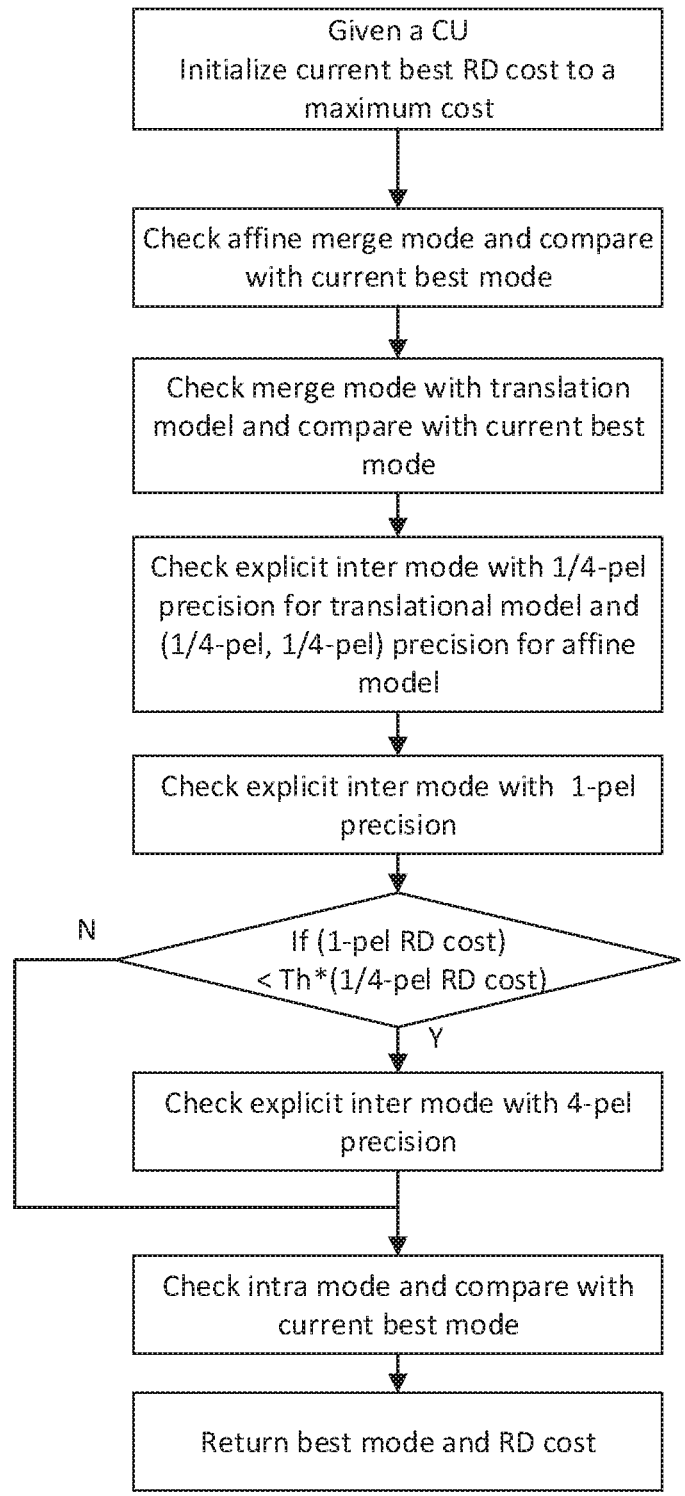
FIG. 10 illustrates mode decision method for a CU coding without split.

In WC, the flowchart of CU mode decision is shown in FIG. 10, where the encoder will check different coding modes and select the best coding mode with minimal RD cost. There are three RD cost checking processes for explicit inter mode with different precision for translation model: ¼-pel, 1-pel, 4-pel. In order to reduce the encoding complexity, 4-pel precision-based RD cost is only calculated when the RD cost of 1-pel precision is smaller than or comparable to the RD cost of ¼-pel. In the RD cost calculation process at ¼-pel precision, the encoder will compare the cost of motion estimation for translation model and affine motion model, and select a motion model with minimal ME cost. The precision for affine motion model is (¼-pel, ¼-pel) for two control points.

In some embodiments, for adaptive MVD precision for an affine motion model, more precisions are introduced. For example, (1-pel, ¼-pel), (⅛-pel, ⅛-pel) are added for an affine model in addition to precision (¼-pel, ¼-pel). The following discussion uses these three precisions for affine model as an example. However, other embodiments may use other precisions or more precision combinations. The (¼-pel, ¼-pel) precision for an affine model may be used as a default precision. In order to reduce the complexity, we keep the ¼-pel RD cost checking process where the affine model with (¼-pel, ¼-pel) precision will be evaluated. We add the remaining affine precision checking to the RD cost checking at 1-pel precision.

Figure 11:
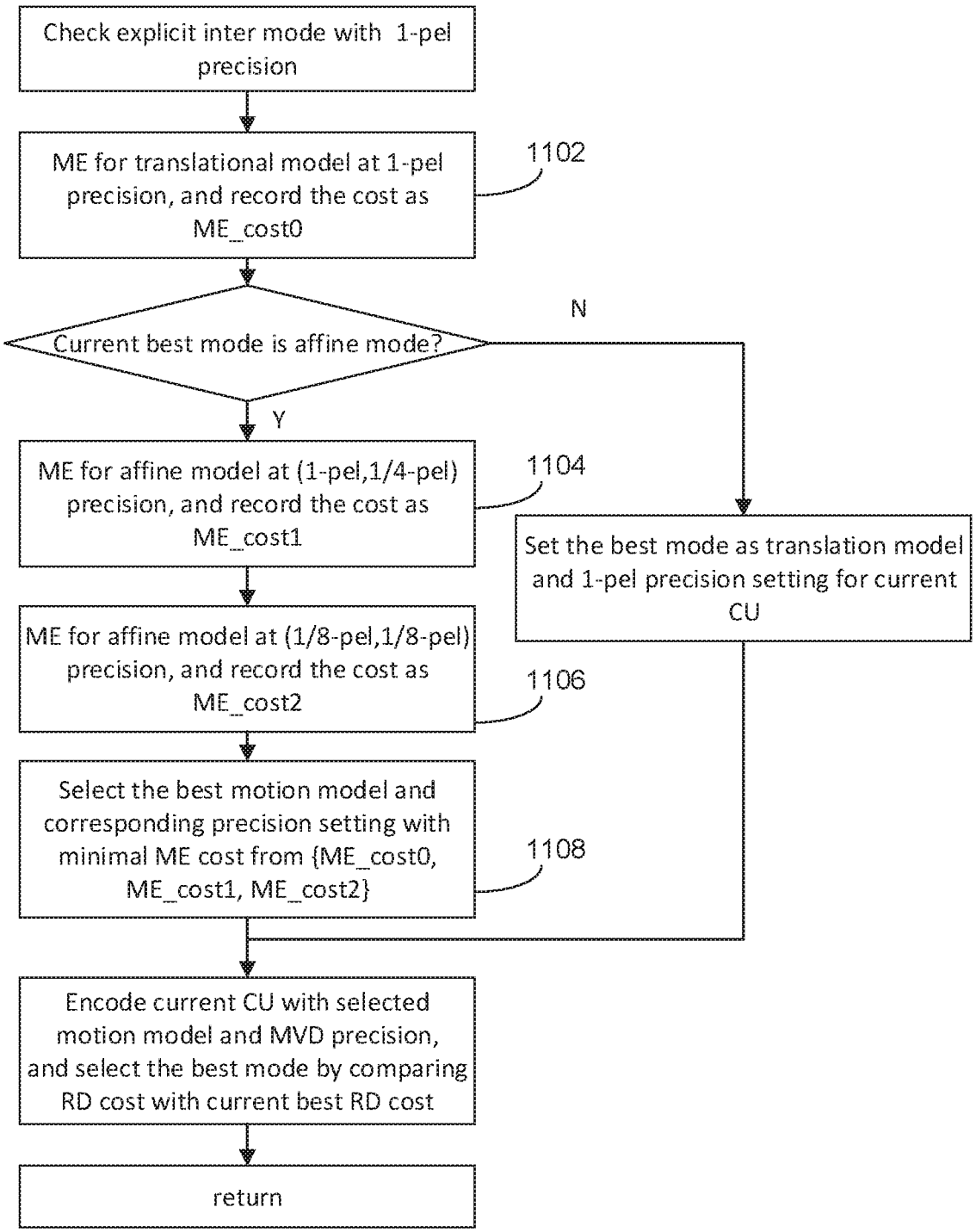
FIG. 11 illustrates a motion model and precision selection method for precisions other than the default precision (¼-pel for translation motion model, (¼-pel, ¼-pel) for affine motion model).

FIG. 11 shows the flowchart of an embodiment using RD cost checking with 1-pel precision. One motion estimation for translation model at precision 1-pel (block 1102), and two affine motion estimations at precision (1-pel, ¼-pel) (block 1104) and (⅛-pel, ⅛-pel) (block 1106) are performed, respectively. The motion model and corresponding precision are selected by comparing their ME costs (block 1108). In order to reduce the encoding complexity, affine motion estimations at those two precisions are only performed when the current best mode is inter coding mode with an affine motion model after the encoder already checks (¼-pel, ¼-pel) precision for the affine model. The reason is that different affine model precisions are only effective when the current CU has affine motion. To further reduce the encoding complexity, in some embodiments, the encoder may check those ME costs for an affine model only when the current best coding mode is affine non-merge mode or the current best coding mode is affine non-skip mode, because the merge and skip mode indicate that the current CU is already coded efficiently and the improvement may be very limited.

Figure 12:
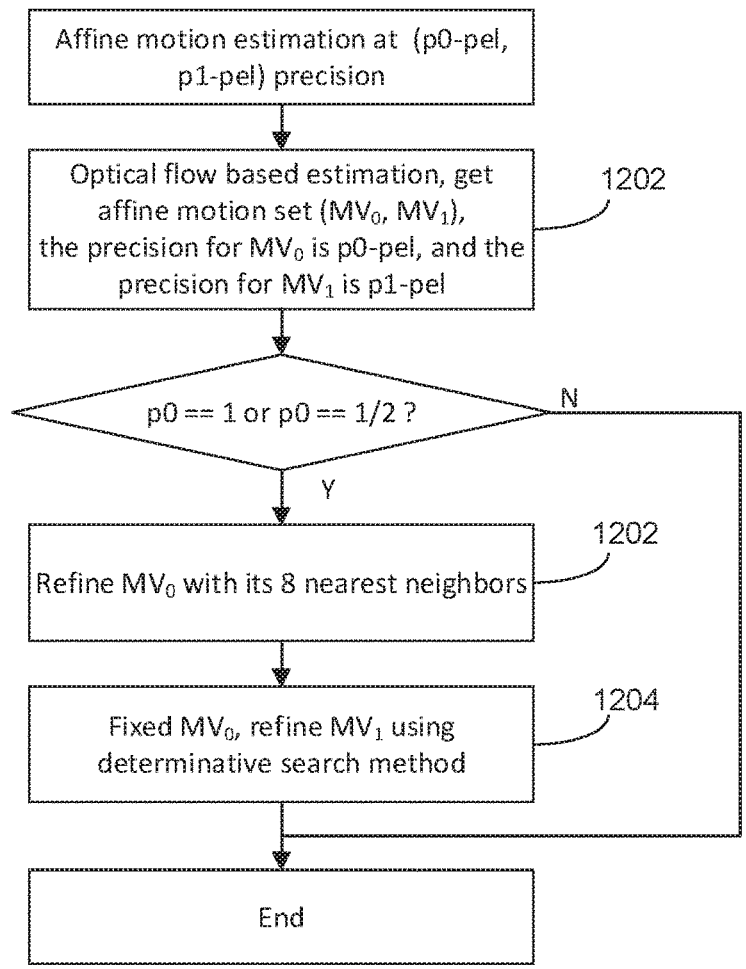
FIG. 12 illustrates an affine motion estimation method for precisions of (p0-pel, p1-pel).

The (1-pel, ¼-pel) and (½-pel, ¼-pel) precisions are lower than the default precision (¼-pel, ¼-pel). It is observed that the optical flow based iterative searching method is not enough because the precision of top left control point is coarse and it is easier for the encoder to get a local minimum. Here we propose a combined search method for this kind of low precision. FIG. 12 is the flowchart of one example of a search method.

Figure 13:
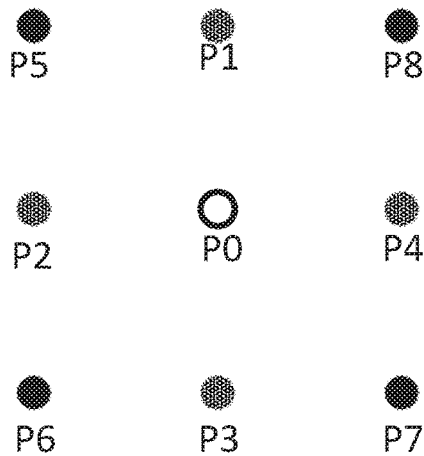
FIG. 13 illustrates refinement of MV0 using the nearest 8 positions. Step 1: select the best position in {P1, P2, P3, P4}; Step 2: select the best from two neighbors if $MV_0$ is updated in step 1.

The optical-flow-based iterative searching described above in the section "Affine Mode" is applied at first. Then we get ($MV_0$, $MV_1$) as the input for next step, where $MV_0$ is MV at top left control point and $MV_1$ is MV at top right control point (block 1202). The next step is to refine $MV_0$ by checking its nearest 8 neighboring positions (block 1204). FIG. 13 shows an example. If P0 is the position to which $MV_0$ points, then it has 8 nearest neighboring positions. The distance between P0 and P4, P1 is the precision for $MV_0$ such as 1-pel or ½-pel. When $MV_0$ is changed to point to a neighboring position, the corresponding $MV_1$ is estimated using the optical-flow-based searching method, and the ME cost is calculated using updated ($MV_0$, $MV_1$). These 8 neighbors are grouped into two groups. The first group is its nearest 4 neighbors {P1, P2, P3, P4}, and {P5, P6, P7, P8} is the second group. Initially, we compare the ME cost at position P0 and ME cost of the neighbor from {P1, P2, P3, P4}. If P0 has the smallest cost, then the refinement of MV0 stops. If any neighbor from the first group has a lower ME cost than that at P0, then the other two neighbors from {P5, P6, P7, P8} will be further compared. For example, if P2 has smallest cost in the first round, then P5 and P6 will be checked further. In this way, the maximum number of cost checking is 6 rather than 8.

Once $MV_0$ is determined, $MV_1$ is refined further (block 1204). The refinement is an iterative search with a square pattern. For each iteration, there is a center position that is the best position at last iteration. The encoder will calculate the ME cost at its 8 neighboring positions and compare with current best ME cost, and move the center position to a new position having the minimal ME cost among center and 8 neighbors. If the neighboring position is already checked in the previous iterations, that position checking will be skipped in the current iteration. The searching will terminate if there is no update in current iteration which means the center is best position. Or the searching will terminate if the searching times meets the pre-define threshold (e.g. 8, or 16).

For a 6-parameter affine model, the search method proposed for a 4-parameter affine model can be extended. Suppose it is desired to search ($MV_0$, $MV_1$, $MV_2$) for 6-parameter affine motion. The search may be performed using at least three steps: initial motion search, translation motion parameter refinement, rotation and zoom motion parameter refinement. The first step and the second step are same as those steps in 4-parameter affine search. The third step is to refine both $MV_1$ and $MV_2$. In order to reduce searching complexity, we can refine these two using an iterative refinement. For example, we fix $MV_0$, $MV_2$ and refine $MV_1$ using the same scheme as $MV_1$ refinement for 4-parameter affine model. After $MV_1$ is refined, we fix $MV_0$, $MV_1$ and refine $MV_2$ using same scheme. Then we refine $MV_1$ again. In this way, we can iteratively refine these two MVs which are related to rotation and zoom motion, until one MV is not changed or the iteration times meets the pre-defined threshold. In order to converge rapidly, the starting MV for refinement may be selected in the following way in this iterative refinement scheme. The selection of the $MV_1$ or $MV_2$ for refinement first may depend on their own precision. Usually, the MV with a lower precision is refined first. If they have same precision, we can select the MV whose control point has a greater distance to the top-left control point.

To further reduce the encoding complexity, the CU size and temporal layer may be considered when the encoder tests various precision at control points for affine-model-based coding. The precision decision may only be performed to large CUs. For example, an example precision determination method may be only applied for those CUs having area greater than a pre-defined threshold (e.g. 16×16). For those CUs having area smaller than the threshold, (¼-pel, ¼-pel) precision is used for two control points. For different temporal layer pictures having different QP settings, the encoder may only test those probable precisions at each temporal layer. For example, only (1-pel, ¼-pel) (¼-pel, ¼-pel) may be tested for higher temporal layer pictures (e.g. highest temporal layer pictures). And only (¼-pel, ¼-pel) (⅛-pel, ⅛-pel) may be tested for lower temporal layer pictures (e.g. lowest temporal layer pictures). For those middle layer pictures, the full precision set may be tested.

Sub-Block Based Affine Motion Compensation and Estimation.

Affine motion estimation is an iterative estimation process. In each iteration, the relationship among temporal difference between original signal and motion compensated prediction signal using current motion vector, spatial gradient and local affine parameters (a, b, c, d in Eq. (3)) is represented by Eq. (7), which is based on optical flow equation. However, in order to reduce the memory access bandwidth at the decoder side, the affine motion compensation prediction is based on sub-block (e.g. 4×4) rather than based on sample. The reason is that usually there will be an interpolation filter to derive the sample value at motion compensation when the motion vector points to a fractional position. This interpolation process can greatly improve the prediction compared to the method to use the sample value at its nearest neighboring integer position directly. But the interpolation refers to multiple neighboring samples at integer positions. Given the MVs at control points, the MV of each sub-block can be derived using Eq. (1) based on the sub-block's center position. If the sub-block size is 1×1, which means the motion compensation is sample-based and each sample may have different motion. Suppose we have a separable interpolation filter with tap length N, and the sub-block size is S×S. For one sample, it operates to fetch (S+N−1)×(S+N−1) integer samples surrounding the reference position that MV points to for interpolation in both horizontal and vertical directions. On average, it operates to fetch ((S+N−1)×(S+N−1)/(S×S)) reference samples at integer position per sample. For sample-based affine motion compensation, where S is equal to 1, it is N×N. For example, N is 8 in HEVC and VTM, the memory access per sample is (121/16) if sub-block size is 4×4. While the memory access amount per sample is 64 for sample-based interpolation, which is 8.5 times compared to 4×4 sub-block based motion compensation. Therefore, sub-block based motion compensation is used for affine motion prediction. In the affine motion estimation method described in the section "Affine Mode", sample-based prediction is used and does not consider this sub-block based motion compensation. From Eq. (3), we know the delta motion for each position is related to its position inside the CU given those affine parameters. Therefore, if we use the center position of a sub-block to derive the motion for all samples inside one sub-block with Eq. (3), then these samples belonging to one sub-block will have same delta motion. For example, if sample location is (i, j) inside the CU, then the center position of the sub-block it belongs to is evaluated as Eq. (24).

$$\begin{cases} i_b = \lfloor i/S \rfloor * S + S/2 \\ j_b = \lfloor j/S \rfloor * S + S/2 \end{cases} \quad (24)$$

Then Eq. (3) is changed to Eq. (25) by substituting (i, j) with ($i_b$, $j_b$).

$$\begin{cases} dv_x^k(i, j) = c * i_b - d * j_b + a \\ dv_y^k(i, j) = d * i_b + c * j_b + b \end{cases} \quad (25)$$

Substituting $dv_x^k(i,j)$ and $dv_y^k(i,j)$ in Eq. (6) using Eq. (25), then we get Eq. (26).

$$I'_k(i,j)-I(i,j)=(g_x(i,j)*i_b+g_y(i,j)*j_b)*c+(-g_x(i,j)*j_b+g_y(i,j)*i_b)*d+g_x(i,j)*a+g_y(i,j)*b \quad (26)$$

In some embodiments, Eq. (26) is used to estimate the optimal affine parameters (a, b, c, d) using a least-square method. In such embodiments for motion estimation, the delta motion for those samples belonging to one sub-block is the same. Therefore, the final MVs at control points will be more accurate for sub-block based motion compensated prediction compared the sample based estimation method using Eq. (7).

Figure 17:
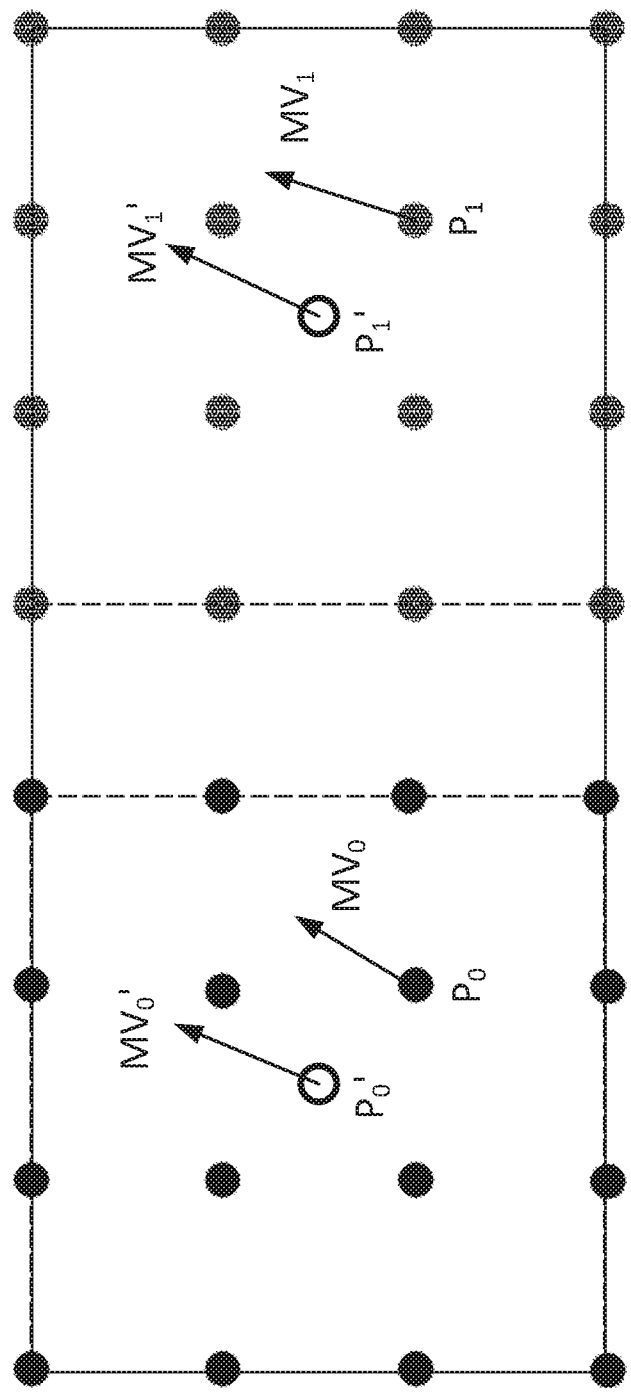
FIG. 17 illustrates motion vector derivation for a sub-block for an 8×4 coding unit.

In affine motion compensation, the position used for the sub-block's MV derivation inside the CU may not be the actual center position of the sub-block. As shown in FIG. 17, the affine CU is 8×4, and the sub-block size for motion compensation is 4×4. The position used for sub-block MV derivation may be calculated with Eq. (24) given a sample position (i,j). Those positions are $P_0$ and $P_1$ for the left 4×4 sub-block and the right 4×4 sub-block, respectively. Based on the coordinates of $P_0$ and $P_1$, the MV is derived with Eq. (1) for a 4-parameter affine model, or Eqs. (8), (9) for a 6-parameter affine model. However, using Eq. (24), $P_0$ and $P_1$ are not the center of those two sub-blocks. $MV_0$ and $MV_1$ may not be accurate for sub-block motion compensated prediction. In one embodiment, we propose using Eq. (27) to calculate the position for sub-block MV derivation.

$$\begin{cases} i_b = \lfloor i/S \rfloor * S + (S-1)/2 \\ j_b = \lfloor j/S \rfloor * S + (S-1)/2 \end{cases} \quad (27)$$

With Eq. (27), $P_0$ will be replaced with $P_0'$, and $P_0'$ is the center of left 4×4 sub-block. Therefore, the corresponding $MV_0'$ is more accurate compared to $MV_0$. Eq. (27) can replace Eq. (24) in affine motion estimation methods described herein to improve the accuracy of affine motion estimation. Given MVs at control points for affine-coded CU, the MV of sub-block for chroma component may reuse the MV for luma component, or they can be derived separately using Eq. (27).

Affine MVD Rounding.

In some implementations of affine motion compensation, although the sub-block MVs derived by the control point MVs are in 1/16-pel precision, the control point MVs are rounded to 1/4-pel precision. The control point MV is derived by adding the MVD to the MV predictor. The MVD is signaled in 1/4-pel precision. The MV predictors are rounded to the 1/4-pel precision before being used to derive the control point MVs. With the adaptive affine MVD precision, the MV predictors used to derive the control point MVs of current coding block may have higher precision than MV precision of the current CU. In this case, the MV predictor will be rounded to a lower precision. The rounding will cause information loss. In some embodiments proposed herein, the control point MVs and MV predictors are kept in the highest precision, e.g. 1/16-pel, while the MVDs are rounded to the desired precision.

In affine motion estimation, the affine parameters may be estimated iteratively. For each iteration, the delta control point MVs may be derived using an optical flow method as described in Eq. (4) and Eq. (5). In an implementation in VTM, the control point MVs of step k are updated by the following equation:

$$MV_i^k = round(deltaMV_i^k, prec_i) + MV_i^{k-1} \quad (28)$$

where i is the index of control point MV. The function $round(deltaMV_i^k, prec_i)$ is used to round $deltaMV_i^k$ to the desired precision $prec_i$. And $MV_i^0$, the initial control point MVs, are rounded to the desired precision. Therefore, $MV_i^k$ is also in the desired precision.

In an example embodiment of a method proposed herein, the control point MVs of step k are updated by the following steps. Top-left control point MV is updated according to Eq. (29)-(31)

$$MVD_{0,hp}^k = deltaMV_0^k + MV_0^{k-1} - MVP_0 \quad (29)$$

$$MVD_0^k = round(MVD_{0,hp}^k, prec_0) \quad (30)$$

$$MV_0^k = MVD_0^k + MVP_0 \quad (31)$$

The top-right and bottom-left control point MVs are updated as Eq. (32)-(33) for i being 1 or 2.

$$MVD_{i,hp}^k = deltaMV_i^k + MV_i^{k-1} - MVP_i - MVD_0^k \quad (32)$$

$$MVD_i^k = round(MVD_{i,hp}^k, prec_i) \quad (33)$$

$$MV_i^k = MVD_i^k + MVP_i - MVD_0^k \quad (34)$$

In Eq. (29)-(34), $MVD_{i,hp}^k$ is the MVD of step k in high precision. Then this high precision MVD is rounded to the desired precision, as shown in Eq. (30) and (33). The control point MV at step k is derived in Eq. (31) and Eq. (34).

Since $MVP_i$ is in 1/16-pel precision, $MV_i^k$ is also in 1/16-pel precision. The signaled MVD, which is derived in Eq. (33) and (34), is in the desired precision (e.g. low precision). In this way, the precision of MV is kept even though the signaled MVD is in low precision. Therefore, the accuracy of motion compensated prediction using MV is improved.

Adaptive Affine MVD Coding.

The affine MVD with different precision may have different characteristics. The control point MVD may have different physical meaning. For example, for (1/8-pel, 1/8-pel, 1/8-pel) or (1/16-pel, 1/16-pel, 1/16-pel) precision compared to (1/4-pel, 1/4-pel, 1/4-pel) precision, the absolute value of MVD may be smaller on average. As described in the section "MVD coding," above, the length of EG codes with different order is different. In general, if the EG order is smaller, the length of EG codes for small values will be shorter, while the length of EG codes for large values will be longer. Some embodiments employ an adaptive EG order for the MVD coding to consider MVD precision and its physical motion meaning (e.g. rotation, zooming in different directions). In some embodiments, the top-left MVD ($MVD_{0x}$, $MVD_{0y}$) has the same EG order as that for non-affine MVD coding since MVD component $MVD_{0x}$ and $MVD_{0y}$ are for translational motion. For a 6-parameter affine model, the MVD components $MVD_{0y}$ and $MVD_{2x}$ are related to rotation motion, and the MVD components $MVD_{1x}$ and $MVD_{2y}$ are related to zooming motion. For a 4-parameter affine model, the MVD component $MVD_{1y}$ is related to rotation motion, and the MVD component $MVD_{1x}$ is related to zooming motion.

In some embodiments, the order of EG codes is different for different MVD coding because MVD values have different characteristics. In some embodiments, for the translational motion related MVD ($MVD_{0x}$, $MVD_{0y}$), the EG order is not signaled; instead, such an MVD may use the same EG order (e.g. 1) as that of non-affine MVD coding.

In some embodiments, the EG order is signaled for Exponential-Golomb codes used for different MVD components corresponding to non-translational motion, such as those MVD components listed in Table 9 for three MVD precisions. In the embodiment of Table 9, six EG orders (EG-order[0] to EG-order[5]) are signaled in the bitstream. The EG order range is from 0 to 3, which uses 2 bits for coding. An MVD precision indicator indicates different MVD precisions. For example, MVD precision indicator "0" is for (¼-pel, ¼-pel, ¼-pel) precision; MVD precision indicator "1" is for (1/16-pel, 1/16-pel, 1/16-pel) precision; MVD precision indicator "2" is for (1-pel, 1-pel, 1-pel) precision. Those signaled EG orders will be to indicate the EG order used for EG binarization of different MVD components with different MVD precisions. For example, EG-order[0] will be used for MVD component $MVD_{1y}$ and $MVD_{2x}$ with MVD precision indicator being "0" (i.e. (¼-pel, ¼-pel, ¼-pel) precision set). For a 4-parameter affine model, $MVD_{2x}$ and $MVD_{2y}$ are not needed to be coded and only $MVD_{1x}$ and $MVD_{0y}$ are coded in Table 9.

TABLE 9

EG order signaling for the Exponential-Golomb codes used for following MVD components

| EG order to be signaled (2 bits each) | MVD precision indicator | MVD components |
|---|---|---|
| EG-order[0] | 0 | $MVD_{1y}$, $MVD_{2x}$ |
| EG-order[1] | 0 | $MVD_{1x}$, $MVD_{2y}$ |
| EG-order[2] | 1 | $MVD_{1y}$, $MVD_{2x}$ |
| EG-order[3] | 1 | $MVD_{1x}$, $MVD_{2y}$ |
| EG-order[4] | 2 | $MVD_{1y}$, $MVD_{2x}$ |
| EG-order[5] | 2 | $MVD_{1x}$, $MVD_{2y}$ |

Signaling of the EG order may be performed in, for example, picture parameter sets or slice header. In embodiments in which the EG order is signaled at the slice header, the encoder may select the EG order based on the previously coded picture at the same temporal layer. After each inter picture is coded, an encoder may compare the total number of bins using different EG codes with different orders for all MVDs in that category. For example, for all $MVD_{1y}$ and $MVD_{2x}$ with MVD precision "0", the encoder will compare the total number bins with EG order 0, EG order 1, EG order 2 and EG order 3, and select the order with minimal value of total number bins. Then the selected order will be used for the following picture coding at the same temporal layer, and the selected order will also be coded at the slice header of the following picture at the same temporal layer.

Further Embodiments

In some embodiments, a method is provided of decoding a video from a bitstream. The method includes, for at least one block in the video: reading from the bitstream information identifying one of a plurality of elements in a selected predetermined precision set, wherein the identified element of the selected predetermined precision set indicates at least a selected first precision and a selected second precision; and decoding the block using an affine motion model, the affine motion model being characterized by at least a first motion vector having the selected first precision and a second motion vector having the selected second precision. The method may include reading from the bitstream information indicating the first motion vector and the second motion vector. The information indicating the first motion vector and the second motion vector may include a first motion vector difference and a second motion vector difference.

In some embodiments, the information identifying one of the plurality of elements is read from the bitstream on a block-by-block basis.

In some embodiments, the first motion vector is associated with a first control point of the block and the second motion vector is associated with a second control point of the block.

In some embodiments, each of the elements of the selected predetermined precision set includes an available first precision and an available second precision. The available second precision may be no lower than the available first precision.

In some embodiments, information identifying the selected predetermined precision set from among a plurality of available predetermined precision sets is read from the bitstream. In some such embodiments, the information identifying the selected predetermined precision set is signaled in a picture parameter set, in a sequence parameter set, or in a slice header. Examples of predetermined position sets include:
  {(1-pel, ¼-pel), (¼-pel, ¼-pel)},
  {(1-pel, ¼-pel), (¼-pel, ¼-pel), (¼-pel, ⅛-pel)},
  {(1-pel, ¼-pel), (¼-pel, ¼-pel), (⅛-pel, ⅛-pel)}, and
  {(1-pel, ¼-pel), (¼-pel, ¼-pel), (¼-pel, ⅛-pel), (⅛-pel, ⅛-pel)}.

In some embodiments, the affine motion model is further characterized by a third motion vector having a selected third precision, where the identified element of the selected predetermined precision set further indicates the selected third precision.

In some embodiments, the information identifying one of the plurality of elements is coded in the bitstream using context-adaptive binary arithmetic coding.

In some embodiments, a determination is made of whether a size of the block is greater than a threshold size, where the information identifying one of the plurality of elements is read from the bitstream for the block only if the size of the block is greater than the threshold size.

In some embodiments, the selected predetermined precision set is selected based on a temporal layer of a picture including the block.

In some embodiments, the selected predetermined precision set is selected based on a shape of the block.

In some embodiments, a method is provided of decoding a video in a bitstream. The method includes, for at least one block in the video: reading from the bitstream (i) first information indicating a first precision from among a first predetermined set of available precisions and (ii) second information indicating a second precision from among a second predetermined set of available precisions; decoding the block using an affine motion model, the affine motion model being characterized by at least a first motion vector having the selected first precision and a second motion vector having the selected second precision; and signaling in the bitstream (i) first information indicating the first precision from among a first predetermined set of available precisions and (ii) second information indicating the second precision from among a second predetermined set of available precisions. The first predetermined set and the second predetermined set may be different.

In some embodiments, the first predetermined set is {1-pel, ¼-pel, ⅛-pel} and the second predetermined set is {½-pel, ¼-pel, ⅛-pel}.

In some embodiments, the first motion vector is associated with a first control point of the block and the second motion vector is associated with a second control point of the block.

In some embodiments, a method is provided for encoding a video in a bitstream. The method includes, for at least one block in the video: encoding the block using an affine motion model, the affine motion model being characterized by at least a first motion vector having a selected first precision and a second motion vector having a selected second precision; and signaling in the bitstream information identifying one of a plurality of elements in a selected predetermined precision set, wherein the identified element of the selected predetermined precision set indicates at least the selected first precision and the selected second precision. The method may further include signaling in the bitstream information indicating the first motion vector and the second motion vector. The information indicating the first motion vector and the second motion vector may include a first motion vector difference and a second motion vector difference.

In some embodiments, the information identifying one of the plurality of elements is sent on a block-by-block basis.

In some embodiments, the first motion vector is associated with a first control point of the block and the second motion vector is associated with a second control point of the block.

In some embodiments, each of the elements of the selected predetermined precision set includes an available first precision and an available second precision. In some embodiments, the available second precision is no lower than the available first precision.

In some embodiments, the method includes signaling in the bitstream information identifying the selected predetermined precision set from among a plurality of available predetermined precision sets. The information identifying the selected predetermined precision set may be signaled in, for example, a picture parameter set, a sequence parameter set, or a slice header.

Examples of predetermined position sets include:
{(1-pel, ¼-pel), (¼-pel, ¼-pel)},
{(1-pel, ¼-pel), (¼-pel, ¼-pel), (¼-pel, ⅛-pel)},
{(1-pel, ¼-pel), (¼-pel, ¼-pel), (⅛-pel, ⅛-pel)}, and
{(1-pel, ¼-pel), (¼-pel, ¼-pel), (¼-pel, ⅛-pel), (⅛-pel, ⅛-pel)}.

In some embodiments, the affine motion model is further characterized by a third motion vector having a selected third precision, and the identified element of the selected predetermined precision set further indicates the selected third precision.

In some embodiments, the information identifying one of the plurality of elements is coded in the bitstream using context-adaptive binary arithmetic coding.

In some embodiments, the method includes determining whether a size of the block is greater than a threshold size, and the information identifying one of the plurality of elements is signaled in the bitstream for the block only if the size of the block is greater than the threshold size.

In some embodiments, the selected predetermined precision set is selected based on a temporal layer of a picture including the block.

In some embodiments, the selected predetermined precision set is selected based on a shape of the block.

In some embodiments, a method is provided for encoding a video in a bitstream. The method includes, for at least one block in the video: encoding the block using an affine motion model, the affine motion model being characterized by at least a first motion vector having a selected first precision and a second motion vector having a selected second precision; and signaling in the bitstream (i) first information indicating the first precision from among a first predetermined set of available precisions and (ii) second information indicating the second precision from among a second predetermined set of available precisions. The first predetermined set and the second predetermined set may be different.

In some embodiments, the first predetermined set is {1-pel, ¼-pel, ⅛-pel} and the second predetermined set is {½-pel, ¼-pel, ⅛-pel}.

In some embodiments, the first motion vector is associated with a first control point of the block and the second motion vector is associated with a second control point of the block.

Some embodiments include a method of encoding a video in a bitstream, where the method includes, for at least one block in the video: determining a first rate-distortion cost of encoding the block using a translation motion model; determining a second rate-distortion cost of encoding the block using an affine prediction model with a first set of affine-model precisions; determining whether the second rate-distortion cost is less than the first rate-distortion cost; in response to a determination that the second rate-distortion cost is less than the first rate-distortion cost, determining at least third rate-distortion cost of encoding the block using an affine prediction model with a second set of affine-model precisions; and encoding the block in the bitstream using an encoding model associated with the lowest determined rate-distortion cost.

In some embodiments, in response to a determination that the second rate-distortion cost is less than the first rate-distortion cost, a fourth rate-distortion cost is determined of encoding the block using an affine prediction model with a fourth set of affine-model precisions.

In some embodiments, a method is provided of encoding a video in a bitstream. The method includes, for at least one block in the video: determining affine parameters a, b, c, and d using the equation $$I'_k(i,j)-I(i,j)=(g_x(i,j)*i_b+g_y(i,j)*j_b)*c+(-g_x(i,j)*j_b+g_y(i,j)*i_b)*d+g_x(i,j)*a+g_y(i,j)*b$$

where I(i,j) is an original luminance signal, I'$_k$(i,j) is a prediction luminance signal, $g_x$(i, j) and $g_y$(i,j) are spatial gradients applied on I'$_k$(i,j), and $$\begin{cases} i_b = \lfloor i/S \rfloor *S + (S-1)/2 \\ j_b = \lfloor j/S \rfloor *S + (S-1)/2 \end{cases}$$

where S is a sub-block size greater than one; and encoding the block in the bitstream using the determined affine parameters a, b, c, and d.

In some embodiments, a method is provided of coding a video. The method includes, for at least one block in the video: identifying a motion vector predictor (MVP) for at least one control point, the motion vector predictor having a first precision; identifying a motion vector difference (MVD) value for the control point, the motion vector difference value having a second precision lower than the first precision; calculating a motion vector for the control point by adding at least the motion vector difference value to the motion vector predictor, the calculated motion vector having the first precision; and predicting the block with affine prediction using the calculated motion vector for the at least one control point. The motion vector difference value may be signaled in a bitstream by an encoder or parsed from a bitstream by a decoder.

In some embodiments, the method is performed by an encoder, and identifying a motion vector difference comprises iteratively: determining a motion vector delta for the control point based on an initial motion vector; updating the motion vector difference based on the motion vector delta; rounding the motion vector difference to the second precision; and adding the rounded motion vector difference to the motion vector predictor to generate an updated motion vector, the motion vector predictor and the updated motion vector having the first precision.

In some embodiments, the first precision is $\frac{1}{16}$-pel precision and the second precision is $\frac{1}{4}$-pel precision.

In some embodiments, predicting the block with affine prediction is performed using two control points, wherein a respective motion vector difference is identified for each control point, and wherein each respective motion vector difference has the second precision.

In some embodiments, predicting the block with affine prediction is performed using three control points, wherein a respective motion vector difference is identified for each control point, and wherein each respective motion vector difference has the second precision.

In some embodiments, a method is provided of decoding a video from a bitstream. The method includes, for at least one block in the video: determining a respective coding order for each of a plurality of motion vector difference (MVD) components based at least in part in information coded in the bitstream; reading each of the MVD components from the bitstream using the respective determined coding order; and decoding the block using an affine motion model, the affine motion model being characterized at least in part by the MVD components.

In some embodiments, the method includes reading from the bitstream information identifying respective precisions for the MVD components, wherein the coding order for the MVD components is determined based in part on the respective precisions. The MVD components may be coded using exponential-Golomb coding, and the coding order may be an exponential-Golomb coding order.

Some embodiments include a method of decoding a video from a bitstream. The method includes, for at least one block in the video: determining a respective coding order for each of a plurality of motion vector difference (MVD) components, wherein the respective coding order for an MVD component is determined based on (i) a precision of the MVD component and (ii) whether the component relates to rotational motion or zoom motion; reading each of the MVD components from the bitstream using the respective determined coding order; and decoding the block using an affine motion model, the affine motion model being characterized at least in part by the MVD components.

Some embodiments further include reading order information from the bitstream, where the order information identifies:

a first coding order associated with (i) $\frac{1}{4}$-pel precision and (ii) rotational motion;

a second coding order associated with (i) $\frac{1}{4}$-pel precision and (ii) zoom motion;

a third coding order associated with (i) $\frac{1}{16}$-pel precision and (ii) rotational motion;

a fourth coding order associated with (i) $\frac{1}{16}$-pel precision and (ii) zoom motion;

a fifth coding order associated with (i) 1-pel precision and (ii) rotational motion; and a sixth coding order associated with (i) 1-pel precision and (ii) zoom motion.

The respective coding order is performed using the order information. The order information may be coded in, for example, a picture parameter set or a slice header.

In some embodiments, the MVD components are coded using exponential-Golomb coding, and the coding order is an exponential-Golomb coding order.

In some embodiments, a method is provided of encoding a video in a bitstream, the method includes, for at least one block in the video: selecting order information, where the order information identifies a coding order for a motion vector difference (MVD) component based on (i) a precision of the MVD component and (ii) whether the component relates to rotational motion or zoom motion; encoding the order information in the bitstream; and encoding the block using an affine motion model, the affine motion model being characterized at least in part by a plurality of MVD components, wherein each of the plurality of MVD components is encoded in the bitstream using a coding order determined by the order information.

In some embodiments, the order information identifies:

a first coding order associated with (i) $\frac{1}{4}$-pel precision and (ii) rotational motion;

a second coding order associated with (i) $\frac{1}{4}$-pel precision and (ii) zoom motion;

a third coding order associated with (i) $\frac{1}{16}$-pel precision and (ii) rotational motion;

a fourth coding order associated with (i) $\frac{1}{16}$-pel precision and (ii) zoom motion;

a fifth coding order associated with (i) 1-pel precision and (ii) rotational motion; and a sixth coding order associated with (i) 1-pel precision and (ii) zoom motion.

Determining a respective coding order may be performed using the order information. The order information may be coded in, for example, a picture parameter set or a slice header.

In some embodiments, the MVD components are coded using exponential-Golomb coding, and the coding order is an exponential-Golomb coding order.

Some embodiments include a non-transitory computer-readable storage medium storing a video encoded using any of the methods disclosed herein. Some embodiments include a non-transitory computer-readable storage medium storing instructions operative to perform any of the methods disclosed herein.

Coded Bitstream Structure.

Figure 15:
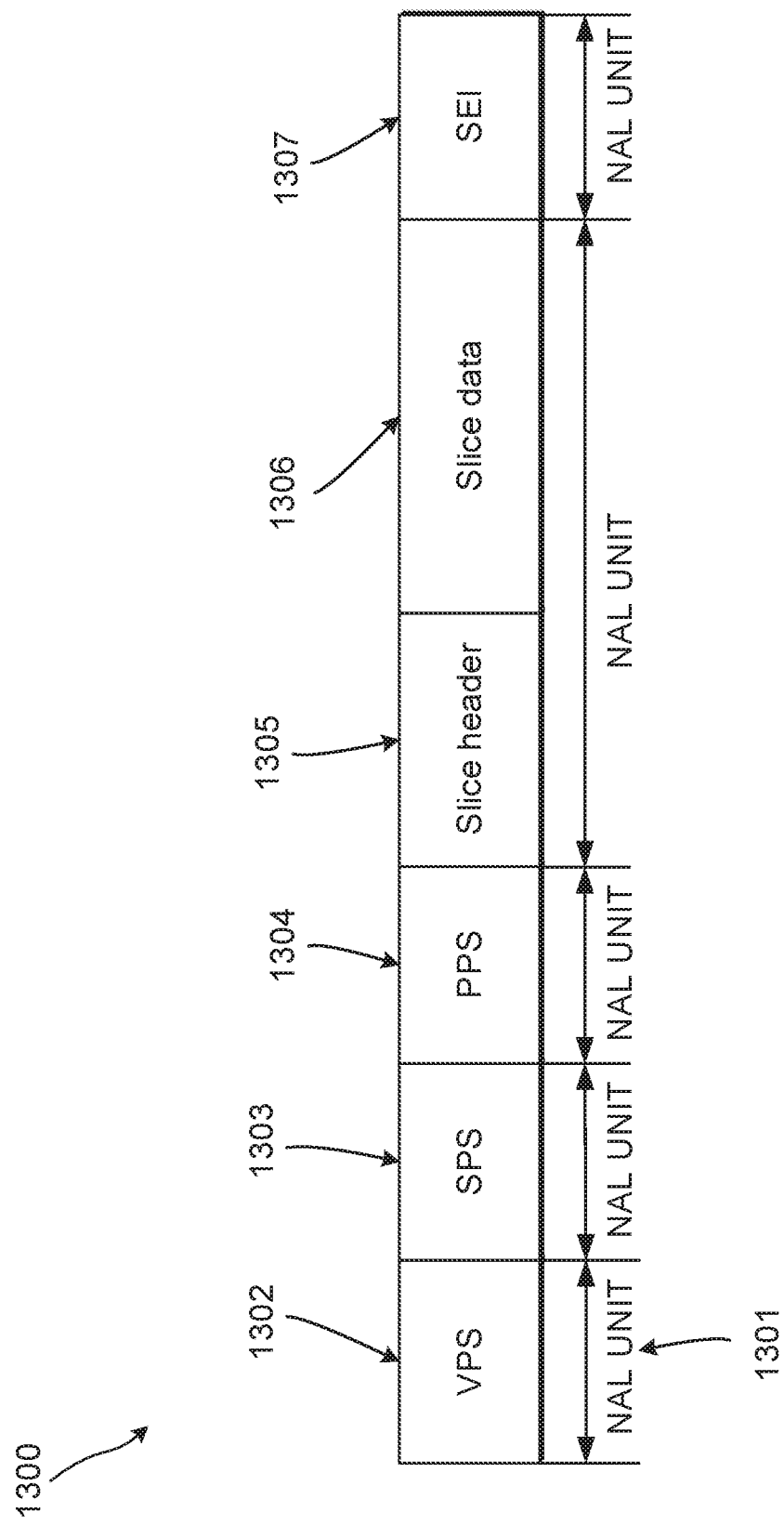
FIG. 15 is a diagram illustrating an example of a coded bitstream structure.

FIG. 15 is a diagram illustrating an example of a coded bitstream structure. A coded bitstream 1300 consists of a number of NAL (Network Abstraction layer) units 1301. A NAL unit may contain coded sample data such as coded slice 1306, or high level syntax metadata such as parameter set data, slice header data 1305 or supplemental enhancement information data 1307 (which may be referred to as an SEI message). Parameter sets are high level syntax structures containing essential syntax elements that may apply to multiple bitstream layers (e.g. video parameter set 1302 (VPS)), or may apply to a coded video sequence within one layer (e.g. sequence parameter set 1303 (SPS)), or may apply to a number of coded pictures within one coded video sequence (e.g. picture parameter set 1304 (PPS)). The parameter sets can be either sent together with the coded pictures of the video bit stream, or sent through other means (including out-of-band transmission using reliable channels, hard coding, etc.). Slice header 1305 is also a high level syntax structure that may contain some picture-related information that is relatively small or relevant only for certain slice or picture types. SEI messages 1307 carry the information that may not be needed by the decoding process but can be used for various other purposes such as picture output timing or display as well as loss detection and concealment.

Communication Devices and Systems.

Figure 16:
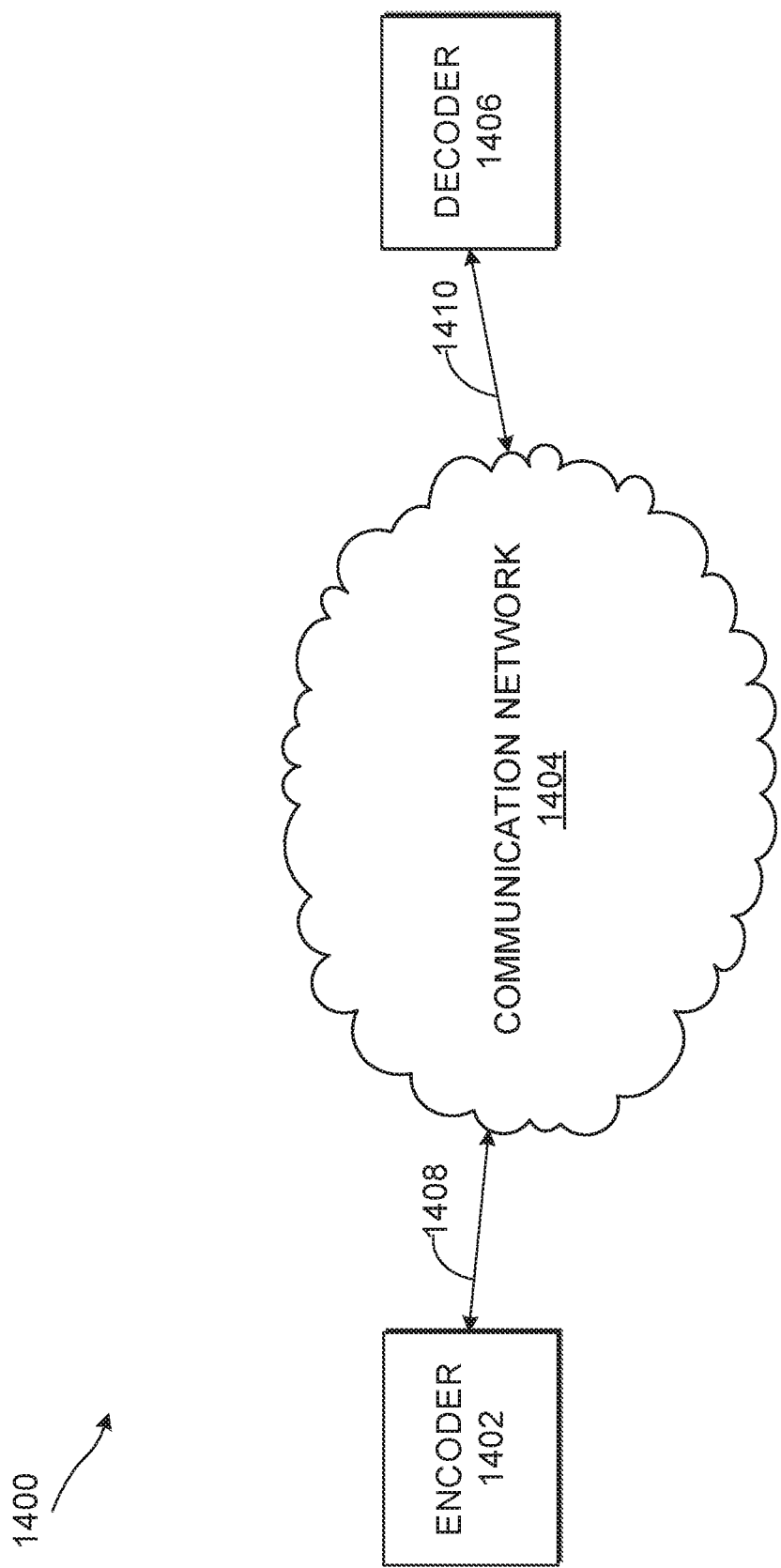
FIG. 16 is a diagram illustrating an example communication system.

FIG. 16 is a diagram illustrating an example of a communication system. The communication system 1400 may comprise an encoder 1402, a communication network 1404, and a decoder 1406. The encoder 1402 may be in communication with the network 1404 via a connection 1408, which may be a wireline connection or a wireless connection. The encoder 1402 may be similar to the block-based video encoder of FIG. 2A. The encoder 1402 may include a single layer codec (e.g., FIG. 2A) or a multilayer codec. The decoder 1406 may be in communication with the network 1404 via a connection 1410, which may be a wireline connection or a wireless connection. The decoder 1406 may be similar to the block-based video decoder of FIG. 2B. The decoder 1406 may include a single layer codec (e.g., FIG. 2B) or a multilayer codec.

The encoder 1402 and/or the decoder 1406 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1404 may be a suitable type of communication network. For example, the communications network 1404 may be a multiple access system that provides content, such as voice, data, video, messaging, broadcast, etc., to multiple wireless users. The communications network 1404 may enable multiple wireless users to access such content through the sharing of system resources, including wireless bandwidth. For example, the communications network 1404 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1404 may include multiple connected communication networks. The communication network 1404 may include the Internet and/or one or more private commercial networks such as cellular networks, WiFi hotspots, Internet Service Provider (ISP) networks, and/or the like.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A video decoding method comprising:
    obtaining information identifying at least a first motion vector predictor and a second motion vector predictor for an affine-coded block in a video;
    obtaining a first motion vector difference and a second motion vector difference;
    obtaining information identifying a precision of the first and second motion vector differences from among a first set of available precisions, wherein the first set of available precisions is different from a second set of precisions available for non-affine inter coding;
    generating (i) a first control point motion vector from the first motion vector predictor and the first motion vector difference and (ii) a second control point motion vector from the second motion vector predictor and the second motion vector difference; and
    generating a prediction of the block using an affine motion model, the affine motion model being characterized by at least the first control point motion vector and the second control point motion vector.

2. The method of claim 1, wherein the plurality of precisions in the first set of available precisions include 1/4-pel, 1/16-pel, and 1-pel precisions.

3. The method of claim 1, wherein the affine motion model is a six-parameter motion model, the method further comprising:
    obtaining information identifying a third motion vector predictor;
    obtaining a third motion vector difference having the identified precision; and
    generating a third control point motion vector from the third motion vector predictor and the third motion vector difference;
    wherein the affine motion model is characterized by the first control point motion vector, the second control point motion vector, and the third control point motion vector.

4. The method of claim 1, wherein the information identifying one of the plurality of precisions is read from a bitstream on a block-by-block basis.

5. The method of claim 1, further comprising rounding at least one of the motion vector predictors to the identified precision.

6. The method of claim 1, wherein each of the control point motion vectors is generated by adding the corresponding motion vector difference to the respective motion vector predictor.

7. The method of claim 1, wherein generating a prediction of the block comprises:
- determining a respective sub-block motion vector for each of a plurality of sub-blocks of the block using the affine motion model; and
- generating an inter prediction of each of the sub-blocks using the respective sub-block motion vector.

8. The method of claim 1, further comprising:
reading from a bitstream a residual for the block; and
reconstructing the block by adding the residual to the prediction of the block.

9. A video decoding apparatus comprising a processor configured to perform at least:
- obtaining information identifying at least a first motion vector predictor and a second motion vector predictor for an affine-coded block in a video;
- obtaining at least a first motion vector difference and a second motion vector difference;
- obtaining information identifying a precision of the first and second motion vector differences from among a first set of available precisions, wherein the first set of available precisions is different from a second set of precisions available for non-affine inter coding;
- generating (i) a first control point motion vector from the first motion vector predictor and the first motion vector difference and (ii) a second control point motion vector from the second motion vector predictor and the second motion vector difference; and
- generating a prediction of the block using an affine motion model, the affine motion model being characterized by at least the first control point motion vector and the second control point motion vector.

10. The apparatus of claim 9, wherein the plurality of precisions in the first set of available precisions include 1/4-pel, 1/16-pel, and 1-pel precisions.

11. The apparatus of claim 9, wherein the apparatus is further configured to read the information identifying one of the plurality of precisions from a bitstream on a block-by-block basis.

12. The apparatus of claim 9, wherein the processor is further configured to round at least one of the motion vector predictors to the identified precision.

13. The apparatus of claim 9, wherein each of the control point motion vectors is generated by adding the corresponding motion vector difference to the respective motion vector predictor.

14. The apparatus of claim 9, wherein generating a prediction of the block comprises:
- determining a respective sub-block motion vector for each of a plurality of sub-blocks of the block using the affine motion model; and
- generating an inter prediction of each of the sub-blocks using the respective sub-block motion vector.

15. A video encoding method comprising:
- obtaining information identifying at least a first motion vector predictor and a second motion vector predictor for an affine-coded block in a video;
- obtaining a first motion vector difference and a second motion vector difference;
- obtaining information identifying a precision of the first and second motion vector differences from among a first set of available precisions, wherein the first set of available precisions is different from a second set of precisions available for non-affine inter coding;
- generating (i) a first control point motion vector from the first motion vector predictor and the first motion vector difference and (ii) a second control point motion vector from the second motion vector predictor and the second motion vector difference; and
- generating a prediction of the block using an affine motion model, the affine motion model being characterized by at least the first control point motion vector and the second control point motion vector.

16. The method of claim 15, further comprising signaling the information identifying one of the plurality of precisions in a bitstream on a block-by-block basis.

17. The method of claim 15, further comprising:
- obtaining a residual by subtracting the prediction of the block from an input video block; and
- encoding the residual in a bitstream.

18. A video encoding apparatus comprising a processor configured to perform at least:
- obtaining information identifying at least a first motion vector predictor and a second motion vector predictor for an affine-coded block in a video;
- obtaining a first motion vector difference and a second motion vector difference;
- obtaining information identifying a precision of the first and second motion vector differences from among a first set of available precisions, wherein the first set of available precisions is different from a second set of precisions available for non-affine inter coding;
- generating (i) a first control point motion vector from the first motion vector predictor and the first motion vector difference and (ii) a second control point motion vector from the second motion vector predictor and the second motion vector difference; and
- generating a prediction of the block using an affine motion model, the affine motion model being characterized by at least the first control point motion vector and the second control point motion vector.

19. The apparatus of claim 18, wherein the processor is further configured to signal the information identifying one of the plurality of precisions in a bitstream on a block-by-block basis.

20. The apparatus of claim 18, wherein the processor is further configured to perform:
- obtaining a residual by subtracting the prediction of the block from an input video block; and
- encoding the residual in a bitstream.

* * * * *